United States Patent [19]
Keeler et al.

[11] Patent Number: 5,781,432
[45] Date of Patent: Jul. 14, 1998

[54] METHOD AND APPARATUS FOR ANALYZING A NEURAL NETWORK WITHIN DESIRED OPERATING PARAMETER CONSTRAINTS

[75] Inventors: James David Keeler; Eric Jon Hartman, both of Austin, Tex.

[73] Assignee: Pavilion Technologies, Inc., Austin, Tex.

[21] Appl. No.: 759,539

[22] Filed: Dec. 4, 1996

Related U.S. Application Data

[63] Continuation of Ser. No. 25,184, Mar. 2, 1993, abandoned.

[51] Int. Cl.$^6$ ............................................. G05B 13/02
[52] U.S. Cl. ...................... 364/164; 364/153; 364/148.03
[58] Field of Search ................................. 364/148–162; 395/2, 22, 24

[56] References Cited

U.S. PATENT DOCUMENTS

| | | | |
|---|---|---|---|
| 4,858,147 | 8/1989 | Conwell | 364/513 |
| 4,912,753 | 3/1990 | Evans, Jr. | 364/513 |
| 4,928,484 | 5/1990 | Peckowski | 60/240 |
| 4,972,363 | 11/1990 | Nguyen et al. | 364/807 |
| 4,979,126 | 12/1990 | Pao et al. | 364/513 |
| 5,023,045 | 6/1991 | Watanabe et al. | 376/215 |
| 5,038,269 | 8/1991 | Grimble et al. | 364/148 |
| 5,111,531 | 5/1992 | Grayson et al. | 395/23 |
| 5,113,483 | 5/1992 | Keeler et al. | 395/23 |
| 5,119,287 | 6/1992 | Nakamura et al. | 364/165 X |
| 5,119,468 | 6/1992 | Owens | 364/165 X |
| 5,175,678 | 12/1992 | Frerichs | 364/148 |
| 5,311,421 | 5/1994 | Nomura et al. | 364/157 |

FOREIGN PATENT DOCUMENTS

| | | | |
|---|---|---|---|
| 0 463 934 A1 | 1/1992 | European Pat. Off. | G05B 13/00 |
| 0 531 712 A2 | 3/1993 | European Pat. Off. | G05B 13/04 |
| 90/10270 | 2/1990 | WIPO | G06F 15/18 |

OTHER PUBLICATIONS

Li, J. et al; "Constrained Predictive Control Using Neural Network"; 1991.

Yan Le Cun, John S. Denker and Sara A. Solla, "Optimal Brain Damage" in *Advances in Neural Information Processing Systems 2*, edited by David S. Touretzky, 1990, pp. 598–605.

(List continued on next page.)

*Primary Examiner*—Reba I. Elmore
*Assistant Examiner*—Steven R. Garland
*Attorney, Agent, or Firm*—Gregory M. Howison

[57] ABSTRACT

A distributed control system (14) receives on the input thereof the control inputs and then outputs control signals to a plant (10) for the operation thereof. The measured variables of the plant and the control inputs are input to a predictive model (34) that operates in conjunction with an inverse model (36) to generate predicted control inputs. The predicted control inputs are processed through a filter (46) to apply hard constraints, the values of which are received from a control parameter block (22). During operation, predetermined criterion stored in the control parameter block (22) are utilized by a cost minimization block (42) to generate an error control signal which is minimized by the inverse model (36) to generate the control signals. The system works in two modes, an analyze mode and a runtime mode. In the analyze mode, the predictive model (34) and the inverse model (36) are connected to either training data or simulated data from the analyzer (30) and the operation of the plant (10) evaluated. The values of the hard constraints in filter (46) and the criterion utilized for the cost minimization (42) can then be varied to change the constraints on the control signals input to the control network, the predicted output of the predictive model (34) and the hard constraints stored in the filter (46). Cost coefficients can be utilized as the criterion to set the input values in accordance with predetermined cost constraints.

37 Claims, 14 Drawing Sheets

OTHER PUBLICATIONS

Andreas S. Weigend, David E. Rumelhart and Barnardo A. Huberman, "Generalization by Weight-Elimination with Application to Forecasting" in *Advances in Neural Information Processing Systems 3*, edited by Richard P. Lippmann, John E. Moody and David S. Touretzky, 1991, pp. 875–882.

Andrew G. Barto, "Connectionist Learning for Control" in *Neural Networks for Control*, edited by W. Thomas Miller, III, Richard S. Sutton, and Paul J. Werbos, 1990, pp. 5–58.

Kumpati S. Narendra, "Adaptive Control Using Neural Networks" in *Neural Networks for Control*, edited by W. Thomas Miller, III, Richard S. Sutton, and Paul J. Werbos, 1990, pp. 115–142.

"Towards Effective Neuromorphic Controllers" by Julio Tanomaru and Sigeru Omatu, *Proceedings of IECON '91*, vol. 2, pp. 1395–1400.

"Neural networks for nonlinear internal model control" by K.J. Hunt and D. Sbarbaro, *IEEE Proceedings—D.*, vol. 138, No. 5, Sep. 1991, pp. 431–438.

"Connectionist Approach to Non-linear Internal Model Control Using Gaussian Approximation" by K.J. Hunt and D. Sbarbaro, *Proceedings for the 1991 American Control Conference*, vol. 2, pp. 1826–1827.

"A Nonlinear Receding Horizon Controller Based on connectionist Models" by D. Sbarbaro and K.J. Hunt, *Proceedings of the 30th IEEE Conference on Decision and Control* (Dec. 1991), vol. 1, pp. 172–173.

"Neural Controllers" by Demetri Psaltis, Athanasios Sideris and Alan Yamamura, *IEEE First International Conference on Neural Networks*, Jun. 21–24, 1987, IV–551–558.

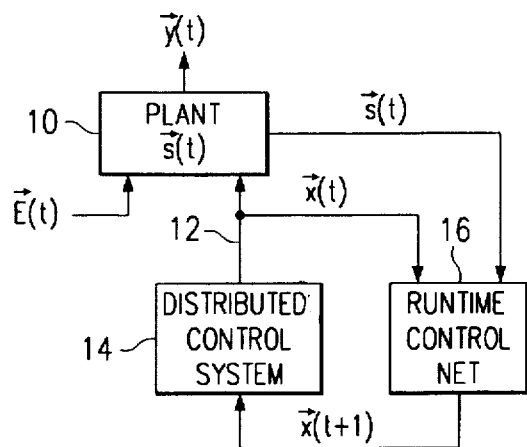
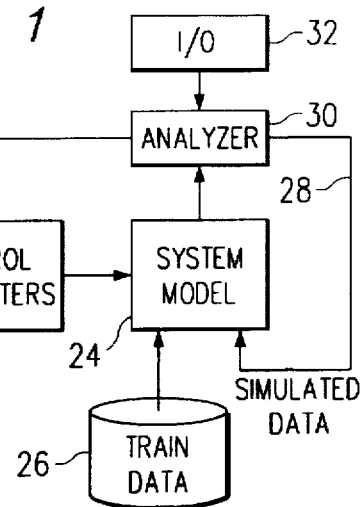
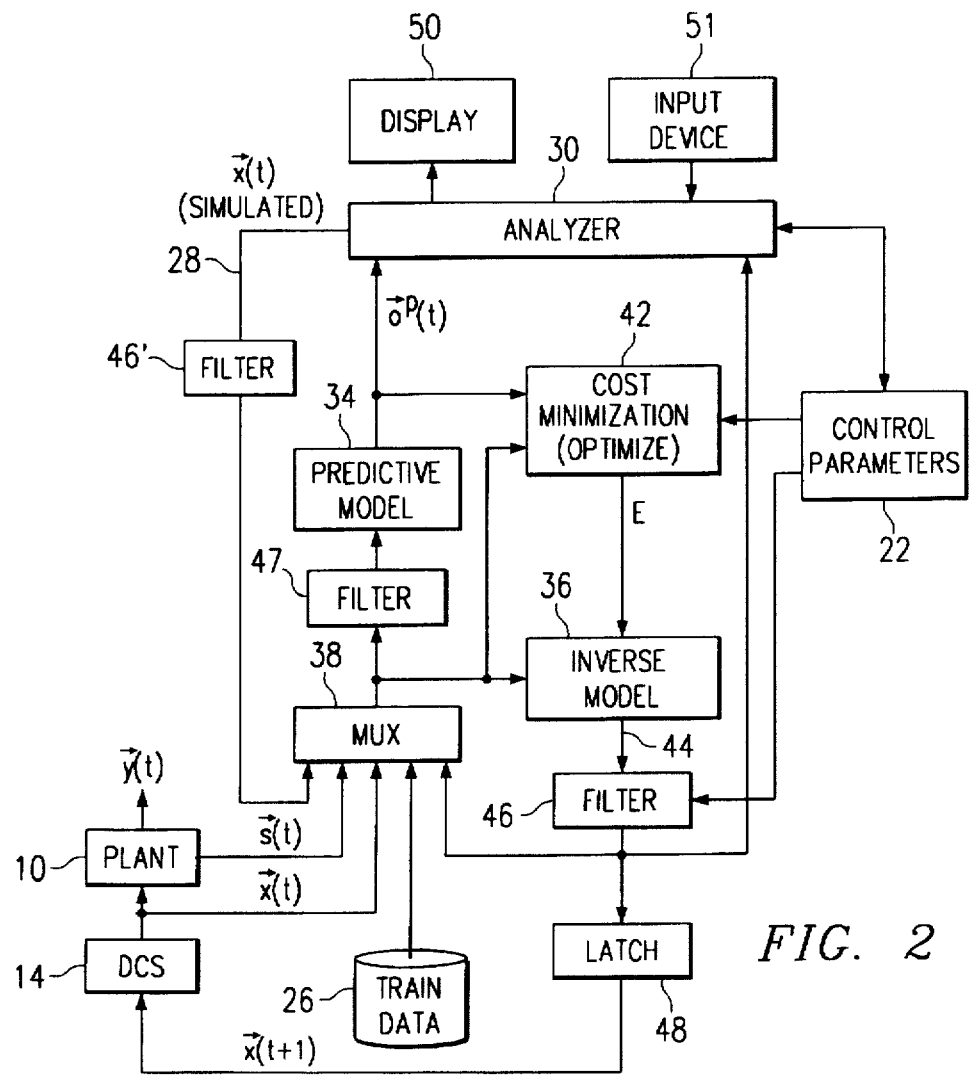
FIG. 1
FIG. 2

| | | |
|---|---|---|
| Variable Name: | templ | Type: Input | Time Delay: -4 |

Statistics:

Minimum Value: 65.0000  278    Mean Value: 93.2746    280    Maximum Value: 124.0000  286

Scale Min: 65.0000    Current Value: 99.1536  282    Scale Max: 124.0000

281

Confidence:

Min-Confidence: 0.0000    Constraint:

Max-Confidence: 0.0000    Min-Constraint: 78.1111    Max-Constraint: 112.1838
                                         288                              290

Conf-Selection: 90%

Rate-Of-Change Constraints:

Max-Decrement: 12.3017    Max-Increment: 10.0357

Clamp: ◇ to value on screen    ☐ Scroll Plot
       ◇ no clamping
       ◇ to computed value    ☐ Update/No Update

[ Help ]    [ Apply ]    [ Cancel ]

*FIG. 11*

METHOD AND APPARATUS FOR ANALYZING A NEURAL NETWORK WITHIN DESIRED OPERATING PARAMETER CONSTRAINTS

This application is a Continuation of application Ser. No. 08/025,184, filed Mar. 2, 1993 now abandoned.

TECHNICAL FIELD OF THE INVENTION

The present invention pertains in general to neural networks, and more particularly, to analyzing the operation of a neural network that operates in a runtime mode and in a separate analyze mode with a parallel model such that simulated constraints can be associated therewith in accordance with user-defined criterion, these simulated constraints then applied to the runtime system.

BACKGROUND OF THE INVENTION

Neural networks have been utilized in an ever increasing manner to predict system operation in the future such that adjustments to the system can be anticipated and also to provide control inputs to a manufacturing control system. These networks provide a non-linear representation of a plant, which non-linear representation was learned through the use of historical training data. Once the system is running, it is often desirable to change any of the operating parameters of the system through the use of either the control operation of the neural network or to determine how changes in the inputs to the neural network will affect the predicted output. These changes are often constrained by physical limitations of the plant, or by user-defined constraints supplied to achieve desired behavior. The present invention provides a novel mechanism for achieving such desired behavior while simultaneously satisfying constraints.

When utilizing neural networks as predictive tools, a system designer may be locked into the overall operating system. For example, control networks typically receive a desired output and then generate control inputs to force the control inputs to a state that will yield the desired input by minimizing the error value between a predictive output and a desired output. However, these control networks provide as an output a control input to the system, which then responds accordingly. However, the way in which the input is applied is not controlled. For example, a user may change the desired output to increase impurity concentration from a given process. This could entail changing the flowrate of two valves, changing the heater control, etc. Unfortunately, the operation of the plant during this change to achieve the desired output is unknown, and it was not until the entire system had settled down and the desired output had been reached that the system is operated as desired. As such, the present control networks and predictive networks provide no method to determine how the system will work under various inputs and then control the operation of the control network to effect changes in the way in which control signals are applied.

SUMMARY OF THE INVENTION

The present invention disclosed and claimed herein comprises a method and apparatus for controlling the operation of a plant. The system includes a control system that has associated therewith a predictive system model that has an input layer for receiving control inputs or plant, an output layer for outputting predicted outputs representing a prediction of the output of the plant and a mapping layer for mapping the input layer to the output layer through a stored representation of the plant. An optimality device is operable to receive at least two of the predicted outputs for the control inputs as input properties. An optimality function is then applied to each of the input properties, the sum of the optimality function is defining a system optimality value. Each of the optimality functions operates such that the extremum thereof corresponds to a user-defined desired behavior of the associated input property. The user-defined behavior for each of the optimality functions is not the same. A predictive system is then operable to generate updated control inputs that extremize the system optimality value.

In another aspect of the present invention, the predictive system for generating the updated control inputs comprises an inverted system model. The inverted system model is comprised of an input layer, an output layer and a hidden layer for mapping the input layer to the output layer through a stored representation of the plant. The inverse model operates in the inverse mode to receive on the output layer the system optimality value and backpropagate this value through the hidden layer to the input layer in accordance with a search technique to generate the updated control inputs.

In yet another aspect of the present invention, a filter device is provided for constraining the control inputs in accordance with the user-defined constraints. The user-defined constraints can comprise hard limits that limit the values of the updated control inputs from exceeding a predetermined value. They can also incorporate rate-of-change constraints that define the maximum incremental change that can be applied to the difference between the received inputs and the updated control inputs. Additionally, the user-defined constraints can comprise combinatorial constraints. These constraints have a value that is defined as the combination of selected ones of the control inputs. The selected ones of the control inputs then have the associated value thereof limited so as not to violate the combinatorial constraints.

In a further aspect of the present invention, an analysis system is provided for determining the desired plant behavior. The analysis system includes a simulated predictive control system that is a substantial representation of the predictive system model. Analysis control inputs are generated by the analysis system in addition to simulated desired plant behavior. The analysis system allows the user to manipulate the simulated desired plant behavior and the generated analysis control inputs in order to generate updated control inputs to cause the simulated predictive control system to operate in accordance with the desired behavior. The analysis system is also operable to allow the user to observe the desired behavior. The manipulated desired plant behavior is then applied to the predictive control system model as the predetermined desired plant behavior in the form of the various optimality functions.

BRIEF DESCRIPTION OF THE DRAWINGS

For a more complete understanding of the present invention and the advantages thereof, reference is now made to the following description taken in conjunction with the accompanying Drawings in which:

FIG. 1 illustrates a block diagram of the overall system of the present invention to provide the analyzer function;

FIG. 2 illustrates a detail of the analyzer;

FIG. 11 illustrates a display for changing the input parameters;

DETAILED DESCRIPTION OF THE INVENTION

Figure 1A:
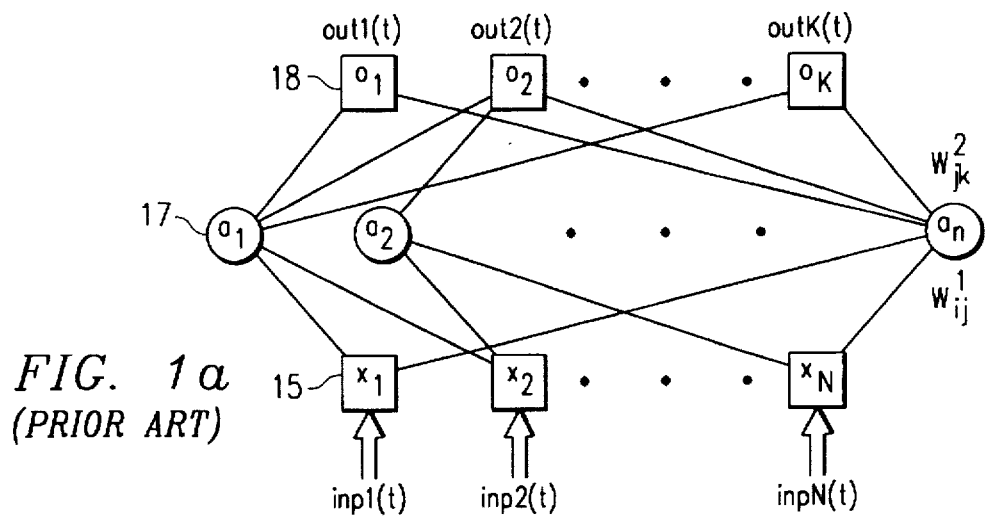
FIG. 1a illustrates a detailed diagram of a conventional neural network.

Referring now to FIG. 1, there is illustrated a block diagram of the overall system and analyzer. In general, a plant 10 is provided that can be any type of physical, chemical, biological, electronic or economic process with inputs and outputs. The plant has an output y(t) and control inputs x(t), the control inputs x(t) provided on an input 12. In addition, the plant 10 has external inputs E(t), which comprise such things as the ambient temperature, the humidity, etc. These are typically parameters that cannot be controlled. The plant also has associated therewith measured state variables s(t), such as flowrates, temperature measurements, etc. These are typically measured variables. It should be understood that the flowrate or the temperature may be directly associated with one of the control inputs x(t) such as, for example, flowrate. Typically, a valve constitutes a control input and the flowrate merely represents the setting on that valve. Therefore, a setting of the valve would constitute a flowrate. However, it is a measure of this flowrate that constitutes a measured state variables in s(t).

The control inputs x(t) are generated by a distributed control system 14. The output of the distributed control system, comprising the control inputs x(t), and the state variables s(t); are input to a runtime control network 16, which generates control inputs x(t+1) that are utilized to provide the settings for the distributed control system 14. The runtime control net 16, as will be described hereinbelow, incorporates a predictive model of the plant 10, in the form of a neural network or any other type of non-linear network. An inverse network is also provided for generating the predictive inputs to the distributed control system 14.

The runtime control network 16 operates in accordance with control parameters stored in a memory block 22. As will be described hereinbelow, the runtime control net will operate the distributed control system 14 in accordance with various criteria such as a desired target output and desired "cost factors" for the input parameters of the network and for the predictive output from the network, and also as to limitations that may be placed upon the control inputs, such as rate-of-change and maximum and minimum constraints on the range of the input values, or combinatorial constraints such as constraints on the ratio or sum of constituents of a mixture.

A parallel system is provided to the runtime control net 16, which utilizes a system model 24. The system model 24 is operable to receive on the input thereof either training data from a memory 26, or simulated data on a line 28. The output of the system model 24 is input to an analyzer 30 which is operable to analyze the overall operation of the network. With this configuration, the plant 10 can be modeled in a system model 24, which system model 24 also incorporates the features of the runtime control net 16, in order to analyze the operation of the plant as a function of constraints that may be placed on the input or on the control inputs to the plant 10, and also on the output of the plant, as indicated by the internal prediction of the output. By providing a parallel system, this operation can be accomplished completely independent of the runtime control net 16. However, once the analysis has been performed by the analyzer 30, new control parameters can be generated, and downloaded to the control parameter block 22 for use by the runtime control net 16 in real time. The analyzer is operated through use of an input/output device 32 such that an operator can input information to the analyzer 30 and this information can be displayed. The analyzer 30 is operable to generate the simulated data on the line 28.

Referring now to FIG. 1a, there is illustrated a detailed diagram of a conventional neural network comprised of input nodes 15, hidden nodes 17 and output nodes 18. The input nodes 15 are comprised of N nodes labelled $x_1, x_2, \ldots x_N$, which are operable to receive an input vector x(t) comprised of a plurality of inputs, INP1(t), INP2(t), . . . INPN(t). Similarly, the output nodes 18 are labelled $o_1, o_2, \ldots o_K$, which are operable to generate an output vector o(t), which is comprised of the output OUT1 (t), OUT2(t), . . . OUTK(t). The input nodes 14 are interconnected with the hidden nodes 17, hidden nodes 17 being labelled $a_1, a_2, \ldots a_n$, through an interconnection network where each input node 15 is interconnected with each of the hidden nodes 17. However, some interconnection schemes do not require full interconnect. Each of the interconnects has a weight $W_{ij}^1$. Each of the hidden nodes 17 has an output $o_i$ with a function g, the output of each of the hidden nodes defined as follows:

$$\vec{a}_j = g\left( \sum_{i=1}^{N} W_{ij}^1 x_i + b_j^1 \right) \quad (1)$$

Similarly, the output of each of the hidden nodes 17 is interconnected with substantially all of the output nodes 18 through an interconnect network, each of the interconnects having a weight $W_{jk}^2$ associated therewith. The output of each of the output nodes is defined as follows:

$$\vec{o}_k = g\left( \sum_{j=1}^{n} W_{jk}^2 a_j + b_k^2 \right) \quad (2)$$

This neural network is then trained to learn the function f(x) that is embedded in the neural network from the input space to the output space as examples or input patterns are presented to it, and a Total-Sum-Square-Error function is minimized through use of a gradient descent on the parameters $W_{jk}^2, W_{ij}^1, b_j^1, b_k^2$.

The neural network described above is just one example. Other types of neural networks that may be utilized are those using multiple hidden layers, radial basis functions, gaussian bars (as described in U.S. Pat. No. 5,113,483, issued May 12, 1992, which is incorporated herein by reference), and any other type of general neural network. In the preferred embodiment, the neural network utilized is of the type referred to as a multi-layer perception network.

Referring now to FIG. 2, there is illustrated a more detailed diagram of the system of FIG. 1, wherein the overall system model 24 and runtime control net 16 are multiplexed in operation with the distributed control system 14. The runtime control net 16 and system model 24 are each comprised of a predictive model 34 and an inverse model 36. The predictive model 34 is represented by the system of FIG. 1a, in that it is operable to receive the control input x(t) and state variables s(t) and output a predictive output $o^p(t)$, which represents the predictive output of the plant 10. The predictive model 34 has therein a stored representation of the plant 10, which stored representation is a learned representation which was learned on the training data stored in the memory 26. This is a separate training operation that will not be described herein, however, these are stored or fixed weights which determine how the predictive model 34 operates. To the extent that the predictive model 34 is an accurate model, the actual output of the plant 10 and the predicted output of the predictive model 34 will be essentially identical. However, whenever the actual output of the plant has to be varied, the plant control inputs must also be varied, this effected through the runtime control net 16 and the distributed control system 14. The predictive model 34 receives the input therefor from the multiplexer 38. The multiplexer 38 is operable to receive the simulated control inputs from the line 28, passing through filter 46', the actual control inputs to the plant 10 as the variable x(t) and the state variables s(t) from the distributed control system 14, or the training data from the memory 26. With regards to the input, the predictive model 34 can generate a predicted output that is a non-linear function of the inputs provided thereto. This predictive output $o^p(t)$ is input to the analyzer 30.

In order to provide the control network function, an error is generated so as to minimize the cost in a cost minimization block 42, which is operable to receive the predictive output $o^p(t)$ of the predictive model 34 and the inputs to the predictive model 34. The cost minimization block 42 also receives control parameters from the control block 22, which are utilized to calculate an error E, which in the preferred embodiment is then processed by the inverse model 36 in accordance with the general operation of a control network to minimize the cost and generate on an output 44 new control inputs. These updated control inputs are input to a block 46 that is labelled "filter". This block 46 functions to satisfy any "hard" constraints that have been placed on the system before they are input to the plant 10, or the predictive model 34. These constraints are of the following three types: 1) range constraints; 2) rate-of-change constraints, or 3) combinatorial constraints. Range constraints are of the form:

$$x_i^{lower} \leq x_i \leq x_i^{upper} \qquad (3)$$

where $x_i^{lower}$ is the lower hard-limit or hard-constraint, and $x_i^{upper}$ is the corresponding upper hard-constraint, meaning that a particular control cannot be varied outside of these limits. Rate-of-change constraints are of the form:

$$\Delta x_{lower_i} \leq \Delta x \leq \Delta x_{upper_i} \qquad (4)$$

where: $\Delta x = x(t+1) - x(t)$ meaning, e.g., that a particular control cannot be changed faster than the prescribed rate.

Combinatorial constraints are used to satisfy limits on the combinations of variables. For example, it is quite common that the sum of all of the flows into a system must equal 100% of the flow out. This is known as a mass-balance constraint, and can be expressed as:

$$\sum_{i \in flow} xi = constant \qquad (5)$$

More generally, we can have any function of the inputs: $F(x) = constant$, such as the ratio of two ingredients must be constant, i.e., $x_i/x_j = C_i$.

The contents of filter 46 are controlled by information received from the control parameter block 22. As will be described hereinbelow, the filter 46 is operable to place hard constraints on the inputs and/or other constraints such as rate of change, etc., that may be required when applying new inputs to the plant 10. As will be appreciated, the predicted inputs generated by the inverse model 36 are generated as a function of the manner in which the overall control net minimizes the error function output by the minimization block 42. This will be described in more detail hereinbelow.

The output of the filter 46 is input to a latch 48, the output of which is input as the control inputs x(t+1) to the DCS 14. The latch 48 is operable to only pass through new control inputs during the runtime mode. During the analysis mode, the latch 48 prevents new data from being updated to the DCS 14. The output of filter 46 is also input back to the analyzer. The analyzer 30 is operable to control the overall operation of the system through either placing it in a runtime mode or placing it in an analysis mode. In the analysis mode, information is displayed on a display 50 with input received from an input device 51. Further, a filter 46' is incorporated on the line 28 to apply the hard constraints to the simulated inputs. Another filter, filter 47, is incorporated on the input to the predictive model 34 to allow constraints to be applied directly to the inputs to the model. Both filter 46' and filter 47 are controlled by block 22.

Figure 3A:
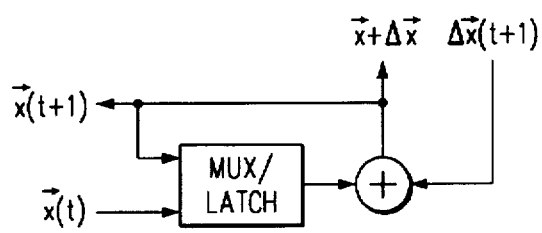
FIG. 3a illustrates a block diagram of the iterate block in FIG. 3.
Figure 3:
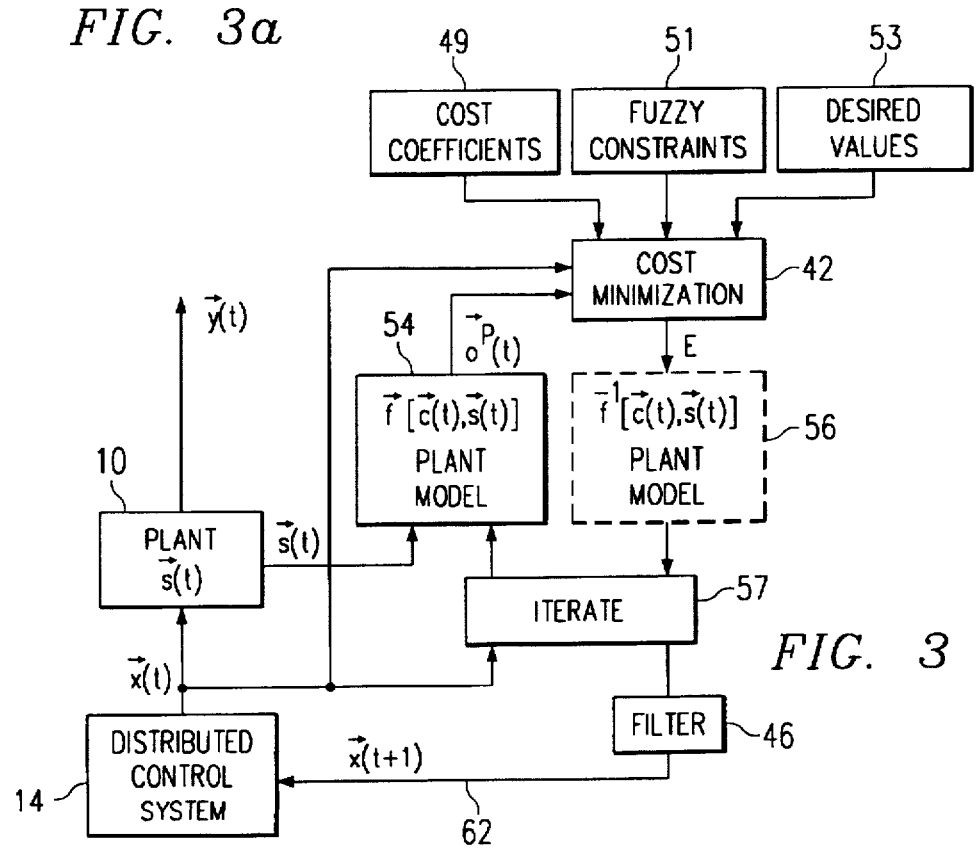
FIG. 3 illustrates a detailed block diagram of the control network.

Referring now to FIG. 3, there is illustrated a block diagram of a control system for optimization/control of a plant's operation in accordance with predetermined weights. A plant is generally shown as a block 10 having an input for receiving the control inputs x(t) and an output for providing the actual output y(t). A plant predictive model 54 is developed with a neural network to accurately model the plant 10 to provide an output $o^p(t)$, which represents the predicted output of plant predictive model 54. The inputs to the plant model 54 are the control inputs x(t) and the state variables s(t). For purposes of optimization/control, the plant model 54 is deemed to be a relatively accurate model of the operation of the plant 10. In an optimization/control procedure, various generated parameters stored in parameter blocks 49, 51 and 53 are input to the cost minimizer 42. The parameters are cost coefficients stored in the parameter block 49, fuzzy constraints stored in the parameter block 51 and desired values stored in the block 53. The operation of each of these will be described hereinbelow. These parameters from the parameter blocks 49, 51 and 53 are utilized by the cost minimization block 42, which also receives the output of the plant model $o^p(t)$ cost and a mechanism for generating new control inputs that satisfy the constraints in filter block 46 so as to minimize the cost. In the preferred embodiment, these new inputs are found through a plant-inverse model where the cost is translated into an error so that the error is input to the plant inverse model to generate new control inputs minimizing cost and satisfying constraints. The error E is input to an inverse plant model 56 which is identical to the neural network representing the plant predictive model 54, with the exception that it is operated by back propagating the error through the original plant model with the weights of the predictive model frozen. This back propagation of the error through the network is similar to an inversion of the network with the output of the inverse plant model 56 representing a Δx(t+1) utilized in a gradient descent operation illustrated by an iterate block 57. In operation, as illustrated in detail in FIG. 3a, the value Δx(t+1) is added initially to the input value x(t) and this sum then processed through the filter 46 and the plant predictive model 54 to provide a new predictive output o''(t) and a new error. This iteration continues until the error is reduced below a predetermined value. The final value is then output as the new predictive control variables x(t+1).

This new x(t+1) values comprise the control inputs that are required to achieve the desired operation of the plant 10. This is input to the plant control system 14, wherein a new value is presented to the system for input as the control variables x(t). The control system 14 is operable to receive a generalized control input which can be varied by the distributed control system 14. The general terminology for the back propagation of error for control purposes is "Back Propagation-to-Activation" (BPA).

In the preferred embodiment, the method utilized to back propagate the error through the inverse plant model 56 is to utilize a local gradient descent through the network from the output to the input with the weights frozen. The first step is to apply the present inputs for both the control variables x(t) and the state variables s(t) into the plant model 54 to generate the predictive output o''(t). A local gradient descent is then performed on the neural network from the output to the input with the weights frozen by inputting the error E in accordance with the following equation:

$$\Delta \vec{x}(t) = -\eta \frac{\partial E}{\partial \vec{x}} \quad (6)$$

subject to the constraints F(x), and where E is the error input to the network, described in more detail hereinbelow, and where η is an adjustable "step size" parameter. The output is then regenerated from the new x(t), and the gradient descent procedure is iterated. In an alternate embodiment, input values of x are chosen at random, subject to the constraints F(x) and the value of x that minimizes E is the given as the new control input.

Figure 4:
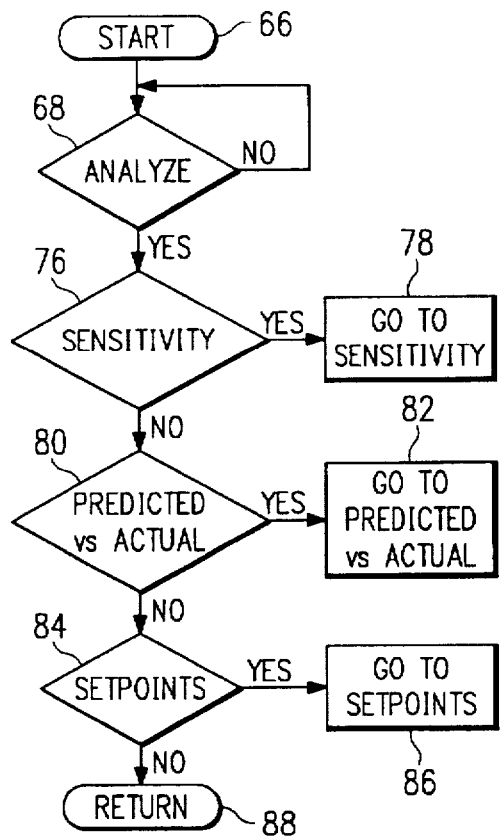
FIG. 4 illustrates a flowchart for the operation of the analyzer at the top level.

Referring now to FIG. 4, there is illustrated a flowchart for the overall operation of the analysis routine by the analyzer 30. The program is initiated at a start block 66 and then proceeds to a decision block 68 to determine whether the analysis operation is to be performed. If not, the program flows back along the "N" path to the input of the decision block 68 and, if so, the program flows along a "Y" path to a decision block 76 to determine if a sensitivity operation is performed. If so, the program flows along a "Y" path to a "Go To" block 78. If the sensitivity operation is not to be performed, the program flows to a decision block along the "N" path to determine if the predictive versus actual operation is to be performed. If so, the program flows along a "Y" path to a "Go To" function block 82. If not, the program flows along an "N" path to a decision block 84 to determine if the Setpoints operation is to be performed. If so, the program flows a "Y" path to a "Go To" block 86. If not, the program flows along an "N" path to a return block 88.

Predictive versus actual tests are designed to run through data from the plant to determine how accurate the model is when it is presented with the training patterns and novel testing patterns. Sensitivity is designed to determine which variables are the most sensitive for affecting the output variables. The Setpoints operation is designed to allow the user to perform "software designed-experiments" by changing input and output parameters of the models, i.e., manipulate the operating conditions of the models.

Figure 5:
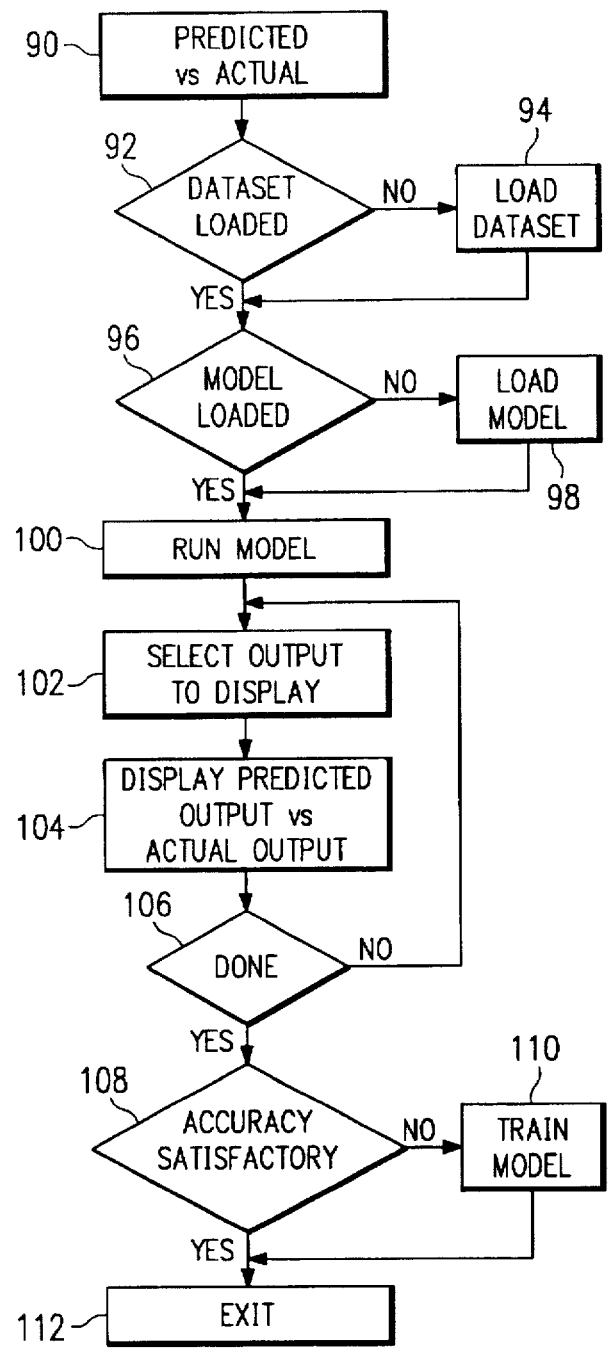
FIG. 5 illustrates a flowchart for generating the display of predicted versus actual output.

Referring now to FIG. 5, there is illustrated a flowchart depicting the operation of comparing the predicted output to the actual output, which is initiated at a block 90, and then the program flows to a decision block 92 to determine if the data set is loaded from memory 26. If so, the program flows along an "N" path to a function block 94 to load the data set and, if it is not to be loaded, the program flows through a "Y" path, both output paths flowing to the input of a decision block 96 that determines whether the model is loaded. If not, the program flows an "N" path to a function block 98 to load the model and then to the input of a function block 100 to run the model. After the model is loaded, the program flows directly to the function block 100 along a "Y" path. The program then flows to a function block 102 to determine which of the outputs in the output vector o''(t) is to be displayed. When selected, the program flows to a function block 104 to display the predicted output versus the actual output and then to the input of a decision block 106 to determine if the operation is done. If not, the program flows back to the input of function block 102 to select another display along the "N" path and, if not, the program flows along the "Y" path to a decision block 108 to determine if the accuracy of the prediction is satisfactory. If the accuracy is not satisfactory, this indicates that the model is not accurately trained and the program will then flow along an "N" path to a function block 110 to perform a model training operation, which is not described in this disclosure. The program will then flow to an exit block 112. If the accuracy is satisfactory, the program will flow directly to the Exit block 112 along a "Y" path from decision block 108.

There are two types of sensitivity determinations that can be performed, sensitivity versus rank and sensitivity versus percent change. In the sensitivity versus rank, the sensitivity of the input variables versus the output variables is calculated by taking the distribution-averaged partial derivatives of the output variables with respect to the inputs. Three separate sensitivity measurements can then be computed. These can be the absolute average total sensitivity, the average total sensitivity and the peak sensitivity. The average is over the distribution of patterns specified by the user, and is computed in each of the cases by the following formulas. The average sensitivity is as follows:

$$\text{Average} = Tsens_{ij} = \sum_{k=1}^{Npats} \frac{\partial o_{k,i}}{\partial x_j} \quad (7)$$

where, $N_{pats}$ is the number of patterns in the data set for which the determination is to be computed over, and $o_{k,i}$ is the $i^{th}$ output for the $k^{th}$ pattern. Similarly, the average total sensitivity, $ATsens_{ij}$ is the sum of the absolute values of the partial derivatives as follows:

$$\text{AverageAbsolute} = ATsense_{ij} = \sum_{k=1}^{Npats} \left| \frac{\partial o_{k,i}}{\partial x_j} \right| \quad (8)$$

Finally, the peak sensitivity is the maximum of the partials over all patterns as follows:

$$\text{Peak} = PkSens_{ij} = \max \left( \left| \frac{\partial o_{k,i}}{\partial x_j} \right|, k\epsilon 1, 2 \ldots Npats \right) \quad (9)$$

The sensitivities associated with the average, average absolute and peak are collective for all of the input/output pairs into a table, and they can be viewed in a plot of the sensitivity versus the input variables. It is convenient to sort the variables according to rank and to plot the variables so that the most sensitive variables are to the left, the least to the right. This sorting is for each view, average, average absolute or peak sensitivity. This information, by way of example, is illustrated in Table 1.

TABLE 1

| Rank | Name | Time-Delay | ATsen | Tsen |
|---|---|---|---|---|
| 1 | flow1 | −4 | 1.40 | 1.40 |
| 2 | press1 | 0 | 0.469 | 0.469 |
| 3 | temp1 | −4 | 0.408 | 0.408 |
| 4 | flow2 | 0 | 0.349 | 0.051 |
| 5 | level1 | 0 | 0.281 | −0.260 |
| 6 | press2 | 0 | 0.178 | −0.178 |
| 7 | antifoam | 0 | 0.156 | −0.080 |
| 8 | temp3 | 0 | 0.135 | −0.051 |
| 9 | press3 | 0 | 0.045 | 0.002 |
| 10 | pumpspeed | 0 | 0.026 | 0.005 |

The calculations of Table 1 are averaged over distributions, but if the input/output relationships are quite non-linear, then this non-linearity is often not fully displayed in the average or peak relationship computed in Table 1; thus, it is very useful to compute the sensitivity as a function of the range of the input data. For this computation, the sensitivity is computed for several different input values in the range of each input variable. For each input variable, several inputs are created as a function of the range of the input, ranging from 0% to 100%. This step is performed holding the values of the other variables constant. For each variable "x", twenty different ranges are computed and the partials at each of the k input values would be as follows:

$$\frac{\partial}{\partial x_k} o(x)|_{x_k} = \frac{\partial}{\partial x_k} o(x)|_{x_k; x_1, x_2, x_{jek} \ldots x_{Nin} = \text{Constant}} \quad (10)$$

where $N_{in}$ is the number of input variables.

Figure 6:
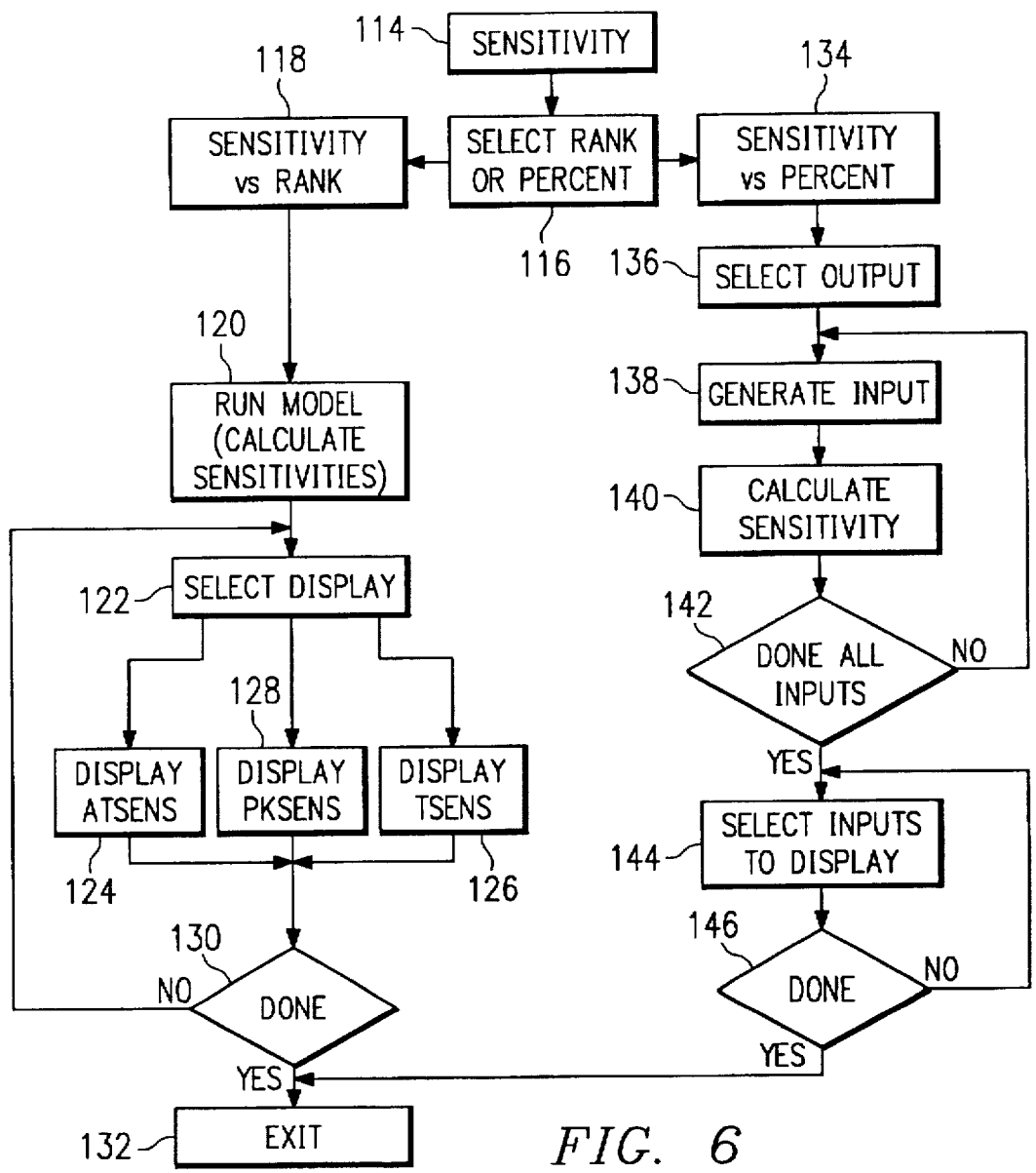
FIG. 6 illustrates a flowchart for determining the sensitivity.

Referring now to FIG. 6, there is illustrated a flowchart depicting the sensitivity operation, which is initiated at a function block 114. The program then flows to a function block 116 that selects rank or percent. If rank is selected, the program flows along a branch to a function block 118 to perform the Sensitivity versus Rank operation. Then, the program flows to a function block 120 to run the model and calculate the Sensitivities. The program then flows to a function block 122 to select the type of display, Average Absolute, Average or Peak. If the Average Absolute is selected, the program flows to a function block 124. If the Average Sensitivity is to be displayed, the program flows along a branch to a function block 126 and, if the Peak Sensitivity is to be displayed, the program flows along a branch to a function block 128. After the display has been selected, the output of all the blocks 124–128 flow to the input of a decision block 130 to determine if the Sensitivities have been displayed. If not, the program flows along an "N" path back to the input of block 122 and, if so, the program flows along a "Y" path to an Exit block 132.

If percent has been selected in the block 116, the program flows along a branch to a function block 134 to initiate the program for the Sensitivity versus Percent operation. The program then flows to a function block 136 to select the desired output from among the outputs associated with the output vector, which output is the predictive output $o^p(t)$. The program then flows to a function block 138 to generate the inputs and then to a function block 140 to calculate the Sensitivity. The program then flows to a decision block 142 to determine if all the inputs have been processed. If not, the program flows back to the input of function block 138 along an "N" path. After completion, the program flows from decision block 142 along the "Y" path to the input of function block 144 to select the inputs to display and then to the input of a decision block 146 to determine if the operation is completed. Once completed, the program flows from decision block 146 along the "Y" path to the input of the Exit block 132.

In addition to determining how sensitive the variables are, the analyzer 30 also has the ability to determine how these variables will affect the output of the plant 10 as their values change. This is facilitated by the "Setpoints" and "What Ifs" tool, wherein the outputs are determined as a function of the user-supplied and modified inputs given certain constraints. Once a trained system model is loaded, the user can then change input values to predict outputs as a function of changing inputs. This can be done under different constraint conditions. In this mode, the user can constrain values to not range outside given conditions, clamp inputs to certain values, and compute the predicted output value along with an estimate of its prediction error for a given set of inputs. This error function is referred to as the "confidence value", which is not the subject of the present application, but was disclosed in U.S. patent application Ser. No. 980,664, filed Nov. 24, 1992, and entitled "Method and Apparatus for Operating and Neural Network with Missing or Incomplete Data".

The inputs are assumed to be independent variables in a standard model, and can be set and constrained according to the user's discretion. In this case, the output of a model, $o^p(x)$ is a function, $f(x)$, that is learned by the neural network model. The input values of $x(t)$ are given by the user, as well as the constraints on $x(t)$. The constraints are of three types: constraints on the absolute range of the values, constraints on the time rate-of-change of the values, and combinatorial constraints on the variables. However, other constraints could be implemented. The absolute constraints are implemented simply as:

$$x_i = \begin{cases} x_{lower_i}; & x_i < x_{lower_i} \\ x_i & \\ x_{upper_i}; & x_i > x_{upper_i} \end{cases} \quad (11)$$

where, $x_{lower_i}$ and $x_{upper_i}$ are the lower and upper hard-constraints on the ith input value $x_i$, respectively. This relation says to replace $x_i$ with its lower or upper constraint value if it ranges outside the constraint.

Similarly, for time-dependent values, the time-rate-of-change on the values can be viewed as the difference, or "delta" of the values, $\Delta(x)=x(t)-x(t-1)$, where $x(t)$ is the value of x sampled at time t and $x(t-1)$ is the value of x sampled at one time-step in the past, where all of the data is on a constant, predetermined time interval. For these delta values, the delta constraints can be implemented as follows:

$$\vec{x}(t) = \begin{cases} \vec{x}(t-1) + \Delta\vec{x}_{lower}; & \vec{x}(t) - \vec{x}(t-1) < \Delta\vec{x}_{lower} \\ \vec{x}(t) & \\ \vec{x}(t-1) + \Delta\vec{x}_{upper}; & \vec{x}(t) - \vec{x}(t-1) > \Delta\vec{x}_{upper} \end{cases} \quad (12)$$

This equation says that the time-rate-of-change, or delta-values of the inputs can never exceed the delta constraints.

Combinatorial constraints are used to satisfy limits on the combinations of variables. These constraints are "hard" in the sense that they reflect physical constraints in the operation of the plant. For example, just as it is required that the sum of the currents into a node of a circuit is equal to the sum of the currents out of the node, so it is in a plant. The sum of the flows into a section of the plant must be equal to the sum of flows out of that same section. This type of constraint is often referred to as "mass balance" or "material balance" requirements, and can be expressed as $F_i(x)=C_i$, meaning that some function $F_i(x)$ of the inputs x is equal to a constant, $C_i$. Other common requirements are "heat balance", meaning the energy in equals the energy out, etc. These also can be expressed as $F_i(x)=C_i$.

To implement combinatorial constraints as a filter on the inputs, it can implement it in a manner very similar to the range constraints, pulling the variables back into their constrained values any time they stray outside of the specified constraint. For example, solve the equation:

$$F_i(x_1, x_2, \ldots x_k, \ldots x_n) = C_i \tag{13}$$

for a particular x, i.e.:

$$X_k = G_i(C_i, x_1, x_2, \ldots x_n) \tag{14}$$

and set all of the $x_i$ for $i \neq k$ to the values output by the inverse model and then set:

$$X_k = G_i(C_i, x_1, x_2 \ldots x_k) \tag{15}$$

This will satisfy the constraint $F_i(x)=C_i$ and provide most of the values (except for the kth one) so as to minimize the cost.

Figure 7:
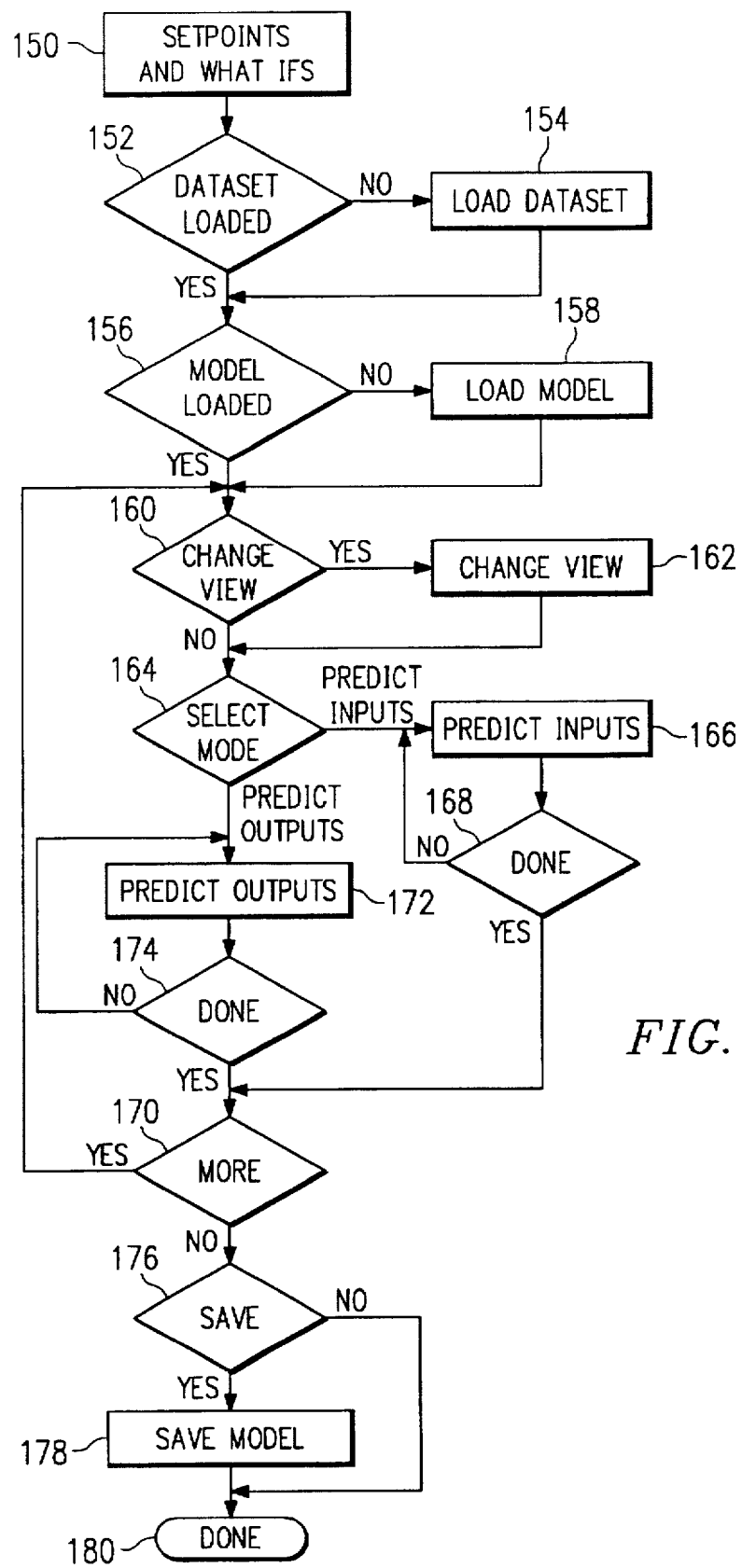
FIG. 7 illustrates a flowchart for displaying setpoints and "what ifs"

Referring now to FIG. 7, there is illustrated a flowchart depicting the operation of initiating the Setpoints and What-Ifs operation, which is initiated at a start block 150 and then proceeds to a decision block 152 to determine if the data set is loaded. If not, the program flows along an "N" path to a function block 154 to load the data set and then to the input of a decision block 156. If the data set is already loaded, the program flows directly to the decision block 156. The decision block 156 determines whether the model is loaded. If not, the program flows to a function block 158 to load the model and then to the input of a decision block 160. If the model is already loaded, the program flows directly to the decision block 160. Decision block 160 determines whether the view needs to be changed. If yes, the program flows to a function block 162 to change the view and then the input of a decision block 164. If the view does not need to be changed, the program flows directly to the input of a decision block 164. The decision block 164 determines which mode is selected, the Predict Inputs mode or the Predict Outputs Mode. If it is the Predict Inputs mode is chosen, the program flows to a function block 166 to predict the inputs and then to a decision block 168 to enter a loop until the inputs are predicted. After prediction of the inputs, the program flows along a "Y" path to the input of a decision block 170 to determine if more analysis is required. If so, the program flows along a "Y" path back to the input of decision block 160.

If the Predict Outputs path is chosen from decision block 164, the program flows to a decision block 172 to perform the output prediction. The program then flows to a decision block 174 to enter a Do loop until the output prediction is complete, after which it flows from decision block 174 along the "Y" path to the input of decision block 170.

After the analysis is complete, the program flows from decision block 170 along the "N" path to the input of a decision block 176 to determine if the model parameters are to be saved. If so, the program flows to a function block 178 to save the model and then to a Done block 180. However, if it is not to be saved, it flows directly to the Done block 180.

Figure 8:
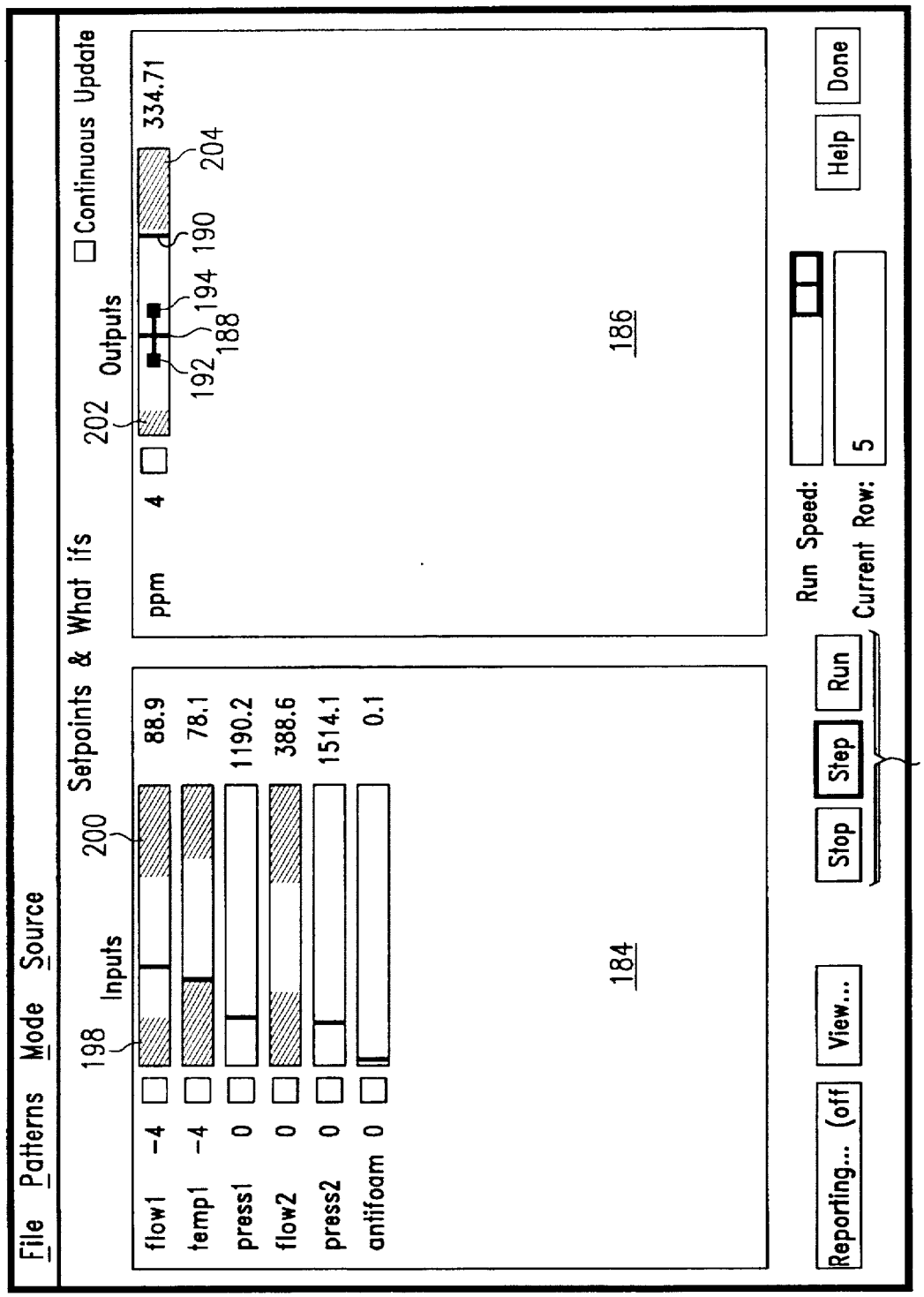
FIG. 8 illustrates the computer display for setpoints and "what ifs"

Referring now to FIG. 8, there is illustrated a diagram of the display depicting the results after selecting the various constraints on the inputs and outputs. There are illustrated five input variables, FLOW1, TEMP 1, PRESS 1, FLOW2, PRESS2 and ANTIFOAM . . . . each of which comprises an input to the predictive model. This is illustrated in a box 184, the output being displayed in a block 186, as the output PPM, which stands for parts per million. Each of the input variables and the output variable have associated therewith a display "bar". The display bar has represented thereon a vertical line which represents the current value for the inputs and, for the output, there is a current value vertical bar 188 and a desired value vertical bar 190. The current value vertical bar 188 has a horizontal bar with terminal indicators 192 and 194 representing an error function that represents the predicted error of the current value of vertical bar 188. This generally indicates what the error of the prediction is. Each of the bars for both the input variables and the predicted output value has the variable name on the left and the actual value of the current value on the right.

Various graphic buttons are available in association with the display. At the bottom of the display, there are three graphic buttons in a group 196, representing a "STOP" function, a "STEP" function and a "RUN" function. The "STOP" function generally stops processing, whereas the "STEP" function allows any changes that the user may make to the variables to be applied to the network to generate the predicted outputs or, in the case of predicting inputs from a common desired output, processing the network for one pattern through the inverse model, as described above. The "RUN" graphics button is utilized whenever the training data is utilized as inputs, such that the predicted output can be viewed as a function of the input data, and also as a function of time.

Each of the display bars associated with each of the variables has associated therewith the ability to apply constraints. In the input, these are hard constraints, and in the output, they are fuzzy constraints. In the input, these are illustrated with respect to the display bar FLOW1, as a lower hard constraint 198 and an upper hard constraint 200. With respect to the output, a lower fuzzy constraint 202 is set and an upper fuzzy constraint 204 is set. These will be described in more detail hereinbelow. However, depending upon the mode chosen, it is only necessary to utilize a conventional computer pointing device, such as a mouse, to grab a left vertical line in any one of the bars and pull this to the right to create the lower constraint, and conversely, to point at and hold the right vertical bar and pull it to the left to create the upper constraint.

Figure 9:
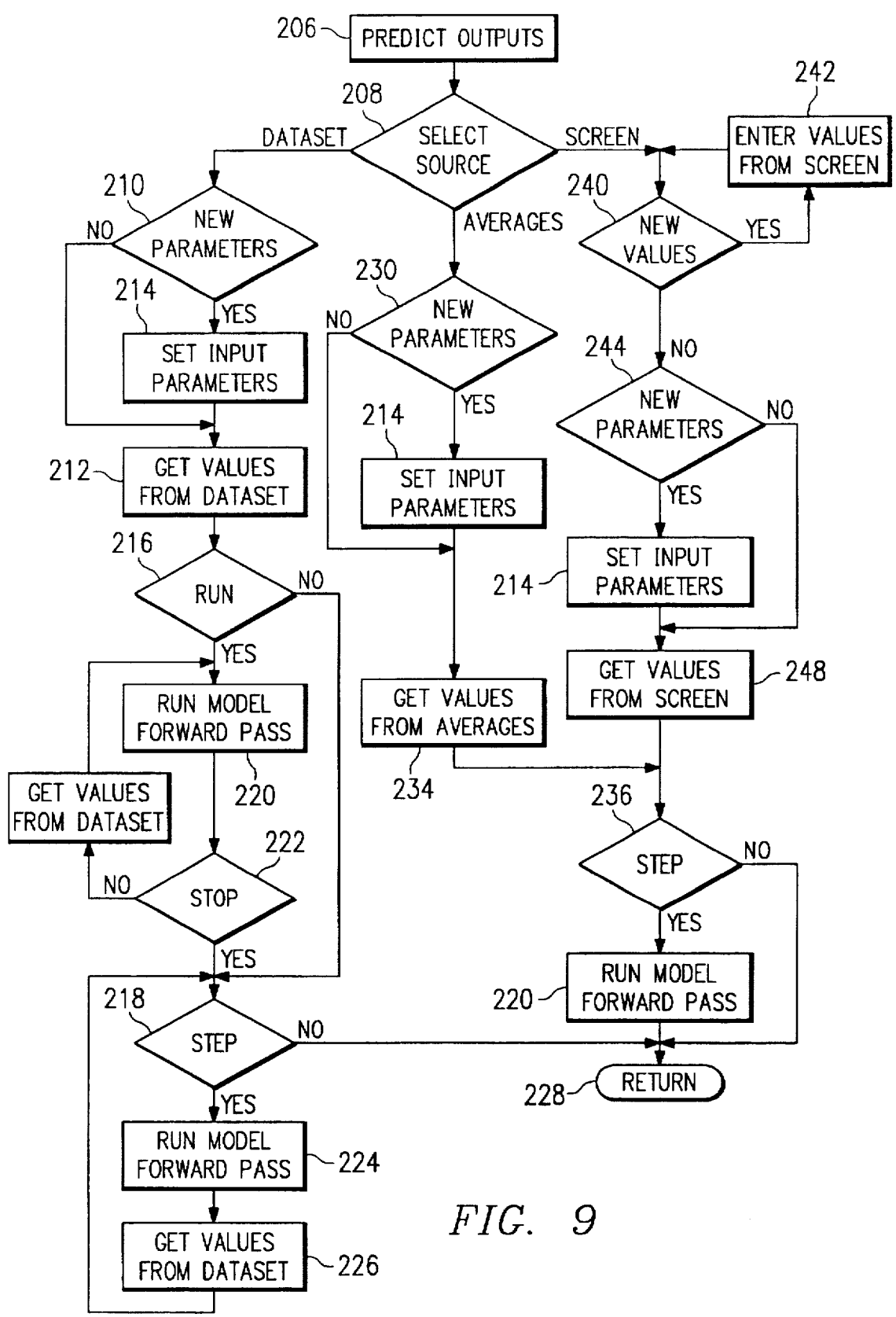
FIG. 9 illustrates a flowchart for changing the predict-outputs mode of setpoints and "what ifs"

Referring now to FIG. 9, there is illustrated a flowchart for the operation wherein the outputs are predicted, which is initiated at a block 206 and then flows to a decision block 208 to determine which of three branches is selected to determine the source. These can be either the data set, the averages of the dataset, or the screen. If the data set branch is chosen, the program flows to a decision block 210 to determine if new parameters are required. If not, the program flows to the input of a function block 212 and, if so, the program flows to a function block 214 to set the input parameters and then to the input of function block 212. Function block 212 is the operation wherein the values are retrieved from the data set which, after retrieval, the program will then flow to a decision block 216 to determine whether the program is to be run. If not, the program will flow to the input of a decision block 218. However, if the outputs are to be predicted using the data set, the program flows to a function block 220 to run the model in a forward pass and then to a decision block 222 to determine if the forward pass is to be stopped. If not, more values are fetched from the database and then the program proceeds back to the input of function block 220. However, after the model has been run in the forward pass with all the data, the program flows from the decision block 222 to the input of decision block 218. Decision block 218 determines whether the step function has been selected from the graphics buttons 196. If so, the program flows to a function block 224 to run the model in a forward pass and then to a function block 226 to get additional values from the data set and then back to the input of decision block 218 to wait for the next step. Once this is completed, the program flows to a return block 228.

If the Averages path has been selected from decision block 108, the program flows to a decision block 230 to determine if new parameters are required. If so, these parameters are set, as indicated by a function block 214, and then the program flows to a function block 234. If no constraints are required, the program flows directly to the function block 234, which function block 234 then fetches the value from the dataset averages, which were determined in the training operation. The program then flows to the input of a decision block 236 to determine if the Step button in the graphics buttons group 196 has been selected. If not, the program flows to the input of the return block 228 and, if so, the program flows to a function block 238 to run the model in the forward pass, i.e., to perform a prediction, and then to the return block 228.

If the Screen source had been selected at decision block 208, the program would flow to the input of a decision block 240 to determine if new values are required. If yes, the program flows to a function block 242 to receive the values from the screen, these input by the user. The program would continue in a loop back to the input of decision block 240 until all values were entered and then would flow to a decision block 244 to determine if new parameters are required. If so, the program flows to a function block 214 to set the constraints and then to the input of function block 248. If no new parameters are required, the program flows directly to function block 248, wherein the values input by the screen are then retrieved and the program flows to the input of decision block 236 to run the model.

Figure 10:
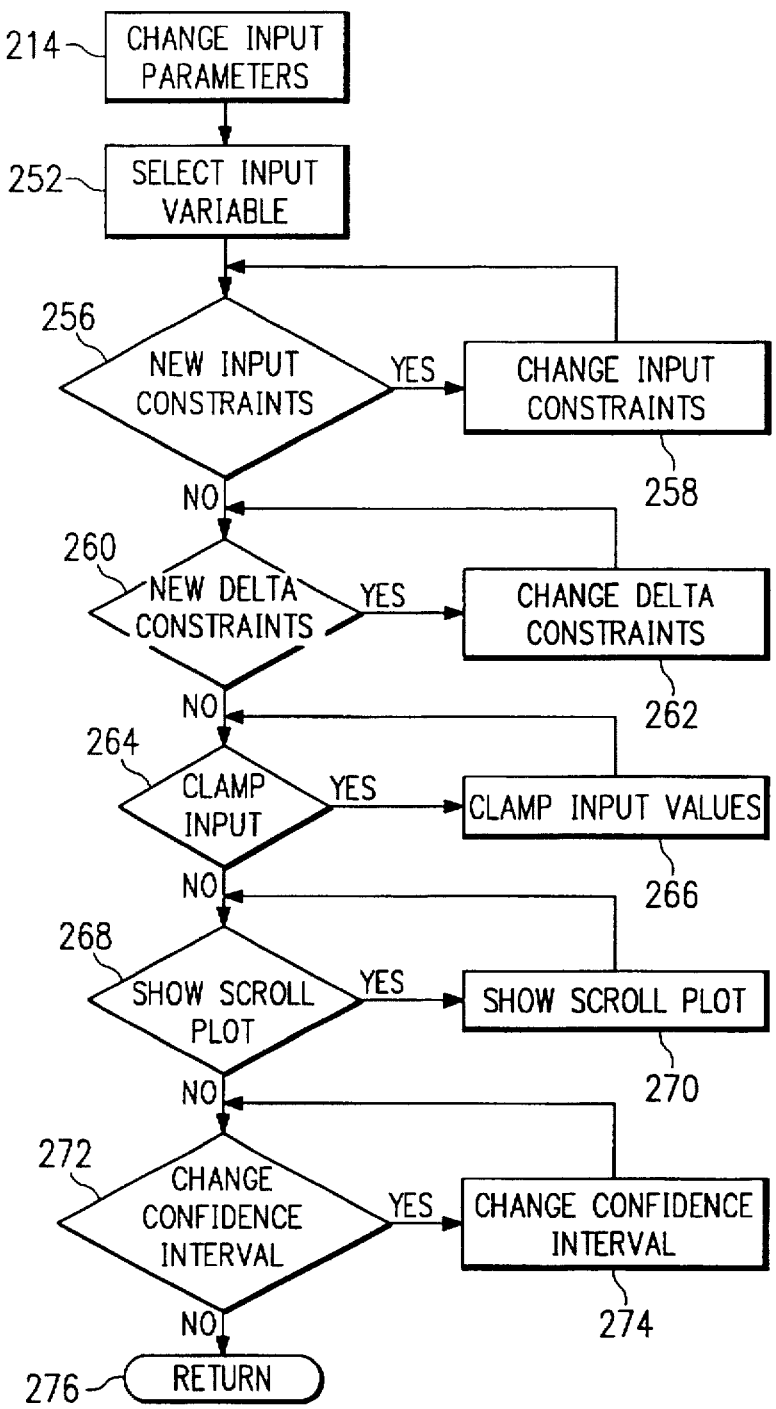
FIG. 10 illustrates a flowchart for changing input parameters.

Referring now to FIG. 10, there is illustrated a flowchart depicting the operation wherein the input parameters are changed, which is initiated at a function block 214 and then flows to a function block 252 to select the input variables. The program then flows to a decision block 256 to determine if new input parameters are required. If so, the program flows to a function block 258 to change the input parameters and then back to the input of block 256. If no constraints are required, the program flows to the input of a decision block 260 to determine if a new delta constraint is required. If so, the program flows to a function block 262 to change the delta constraints (rate-of-change constraints) and then back to the input of block 260. If no new delta constraints are required, the program flows to the input of a decision block 264 to determine if the inputs should be clamped. This operation indicates that the input values should not change. If so, the program flows to a function block 266 to perform the clamping operation and back to decision block 264. If the inputs are not to be clamped, the program flows to the input of a decision block 268 to determine if the Scroll Plot should be illustrated. If so, the program flows to a function block 270 to turn on this feature and then back to the input of function block 268. If the Scroll Plot is not to be displayed, the program flows to the input of a decision block 272 to determine if the Confidence Interval is to be changed. As described above, this is associated with the error of the predicted value, which is the subject of another and pending application. However, if the Confidence Interval is to be changed, the program flows to a function block 274 to change the Confidence Interval and then back to block 274. If the Confidence Interval is not to be changed, the program flows to a return block 276.

Referring now to FIG. 11, there is illustrated an illustration of the display for the input parameters. This display illustrates the variable TEMP1 changes have been made the input parameter. In this example, there is illustrated a display bar 278 with a current input value 280. The initial staring value is represented by a dotted line 281 that is not displayed, but which would represent the status of the display bar 278 prior to any change. The display bar 278 has a minimum value of 65, a maximum value of 124 and a mean value of 93.2746. The current value of the vertical bar 280 is illustrated in box 282 as being 99.1536, whereas, the initial starting value was at a value of 93.2745. It can be seen that the current value of the input, represented by the bar 280, is illustrated in box 282 below the bar 278.

To change the value from the initial value 281 to the current value 280, it is only necessary to point at the current value and pull it to the right. This will result in a change in value in the box 282. Additionally, a minimum constraint can be placed on the input value, which represents a lower boundary by pointing to the left vertical bar of the bar 278 and pulling it to the right to create a shaded area 284. Similarly, an upper constraint can be created by pulling the right vertical bar of the bar 278 to the left, creating a shaded area 286. The minimum constraint is represented in a box 288 as a value of 78.1111, and a maximum constraint is represented in a box 290 as a value 112.1838.

Additionally, rate-of-change constraints (delta constraints) can be provided by inputting two values, a max-decrement and max-increment. The max-decrement is set at a value of 12.3017 and the max-increment is set at a value of 10.0357. The decrements are set in accordance with the following equations:

$$x_{LCI} \leq x_i \leq x_{UCI} \tag{16}$$

$$\Delta_{CLI} \leq x_i(t+1) - x_i(t) \leq \Delta_{CUI}$$

where:

$\Delta_{CLI}$=Max–Decrement $\Delta_{CUI}$=Max–Increment

As can be seen from the above equations for the rate of change constraints, the amount that the input variable can change for each "Step" through the network will be set. This provides for an additional level of control over the predicted control variables. For example, if it is desirable to change a flow setting, the control input device, such as a valve, is not immediately changed to a new setting but, rather, it is incrementally changed.

Figure 12:
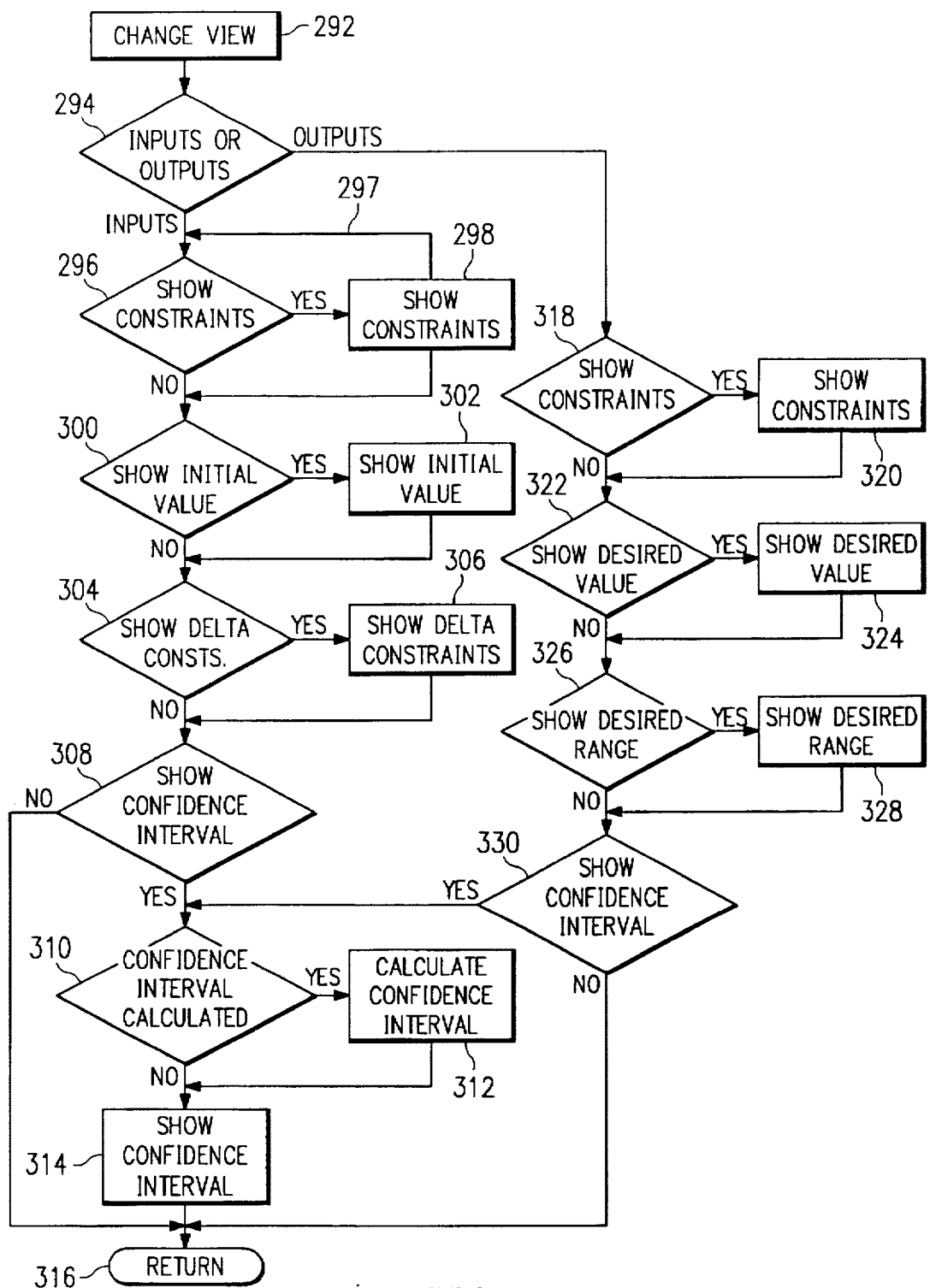
FIG. 12 illustrates a flowchart for the operation of changing the view in the analyzer.

Referring now to FIG. 12, there is illustrated a flowchart depicting the operation to change the view, which is initiated at a function block 292, and then proceeds to a decision block 294, which determines whether an input branch or an output branch is selected. If an input branch is selected, the program flows to a decision block 296 to determine if constraints are to be illustrated. If so, the program flows to a function block 298 to turn on that feature, and then to a decision block 300. If the constraints are not to be illustrated, the program flows directly to a decision block 300, which decision block 300 determines whether the initial value is to be illustrated. If so, the program flows to a function block 302 to turn on this feature and then to the input of a decision block 304. If not, the program flows directly to a decision block 304. Decision block 304 determines whether the delta constraints are displayed. If so, the program flows to a function block 306 to turn on this feature, and then to a decision block 308. If the feature is not to be displayed, the program flows directly to a decision block 308, which decision block determines whether the Confidence Interval is to be illustrated. If it is to be illustrated, the program flows to a decision block 310 to determine whether it is to be calculated. If so, the program flows to a function block 312 to calculate this interval, and then to a function block 314 to display the interval. If the interval is not to be calculated, the program flows directly to the function block 314. After this has been illustrated, the program flows to a return block 316. If the Confidence Interval is not to be illustrated, the program will flow directly to the Return block 316.

If the outputs are to be viewed, the program will flow to a decision block 318 to determine if the constraints are to be illustrated. If so, the program flows to a function block 320, which will illustrate the constraints, and then the program flows to a decision block 322. If the constraints are not to be illustrated, the program flows directly to the system block 322, which decision block determines whether the desired values are to be illustrated. If so, the program flows to a function block 324 to display the desired value, and then to a decision block 326. If the desired value is not to be displayed, the program will flow from a decision block 322 to a decision block 326, which decision block 326 determines whether the desired range is to be displayed. If so, the program flows to a function block 328 to display the desired range and then to a decision block 330. If the desired range is not to be displayed, the program flows directly to the decision block 330. The decision block 330 determines whether the confidence interval is to be illustrated, if so, the program flows to the input of decision block 310 and, if not, the program flows to the Return Block 316.

Figure 13:
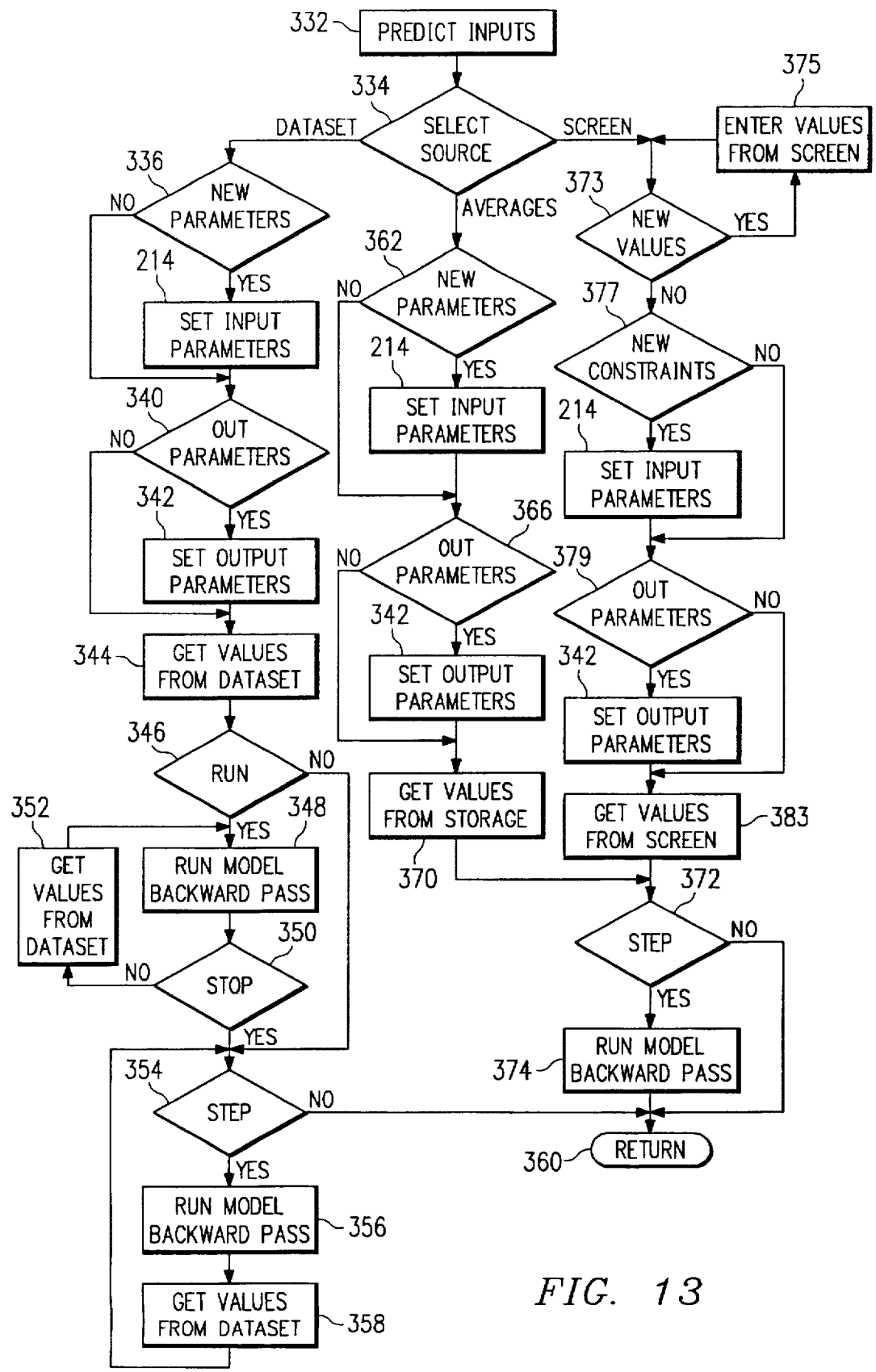
FIG. 13 illustrates a flowchart for predicting the inputs.

Referring now to FIG. 13, there is illustrated a flowchart for the operation wherein the inputs are predicted, which is initiated at a function block 332 and then flows to a decision block 334 to determine one of three branches from which to select the source, the data set, the averages or the screen. If the data set is chosen, the program flows to a decision block 336 to determine if new parameters are to be applied, and if so, the program flows to a function block 214 to set the constraints and then to a decision block 340. If not, the program flows directly to the decision block 340, decision block 340 determining whether the output parameters are to be set. If so, the program flows to a function block 342 to set the output parameters and then to a function block 344. If the output parameters are not to be set, the program flows directly to the function block 344, the function block 344 denoting the operation wherein the values are obtained from the data set in the memory 26. The program then flows to a decision block 346 to determine whether the run operation has been activated. If so, the program flows along a "Y" path to a function block 348 to run the inverse model (run model in a backward pass) and then to a function block 350 to determine if the step operation has been selected. If not, the program flows to a function block 352 to get additional values from the data set and then back to the input of the function block 348 to continue the Run operation. This will continue until a Stop function has been indicated, after which the program will flow to a decision block 354 to determine if the Step operation has been selected. If so, the program will flow to a function block 356 to run the model in a backward pass and then to a function block 358 to obtain additional values and back to the input of the decision block 354 to wait for the next step. If another Step is not selected and the program is halted, the program flows to a Return block 360.

If the source is the averages database, which is determined in the sensitivity operation, the program will flow to a decision block 362 to determine if new parameters are to be selected. If so, the program flows to a function block 214 to set the input parameters, and then to a decision block 366. If not, the program flows directly to the decision block 366, which decision block 366 determines if the output parameters are to be set. If so, the program flows to a function block 342 to set the output parameters and then to a function block 370 to get the values from the area in storage wherein the values are stored after processing through the training operation. If the output parameters are not to be selected, the program will flow directly to the function block 370. After the values have been retrieved, the program flows to the input of a decision block 372 to determine if the Step function has been selected. If not, the program flows to the Return block 360. However, if the Step operation is to be utilized, the program will flow to a function block 374 to run the model in a backward pass and then to the Return block 360.

If the source is the screen, the program flows from decision block 334 along the "SCREEN" path to a decision block 373 to determine if new values are required. If yes, the program flows through a loop including a function block 375 to enter values from the screen and then back to the input of decision block 373. If no new values are required, the program flows to a decision block 377 to determine if new parameters are required. If not, the program flows to the input of a decision block 379 and, if so, the program flows through a function block 214 to set the input parameters and then to the input of the decision block 379. The decision block 379 determines whether output parameters are to be entered. The program then flows to a function block 383 to get the value from the screen. If output parameters are to be input, the program flows to a function block 379 to set the output parameters and then to the function block 383. After the values are obtained from the screen, the program flows to the decision block 372.

Figure 14:
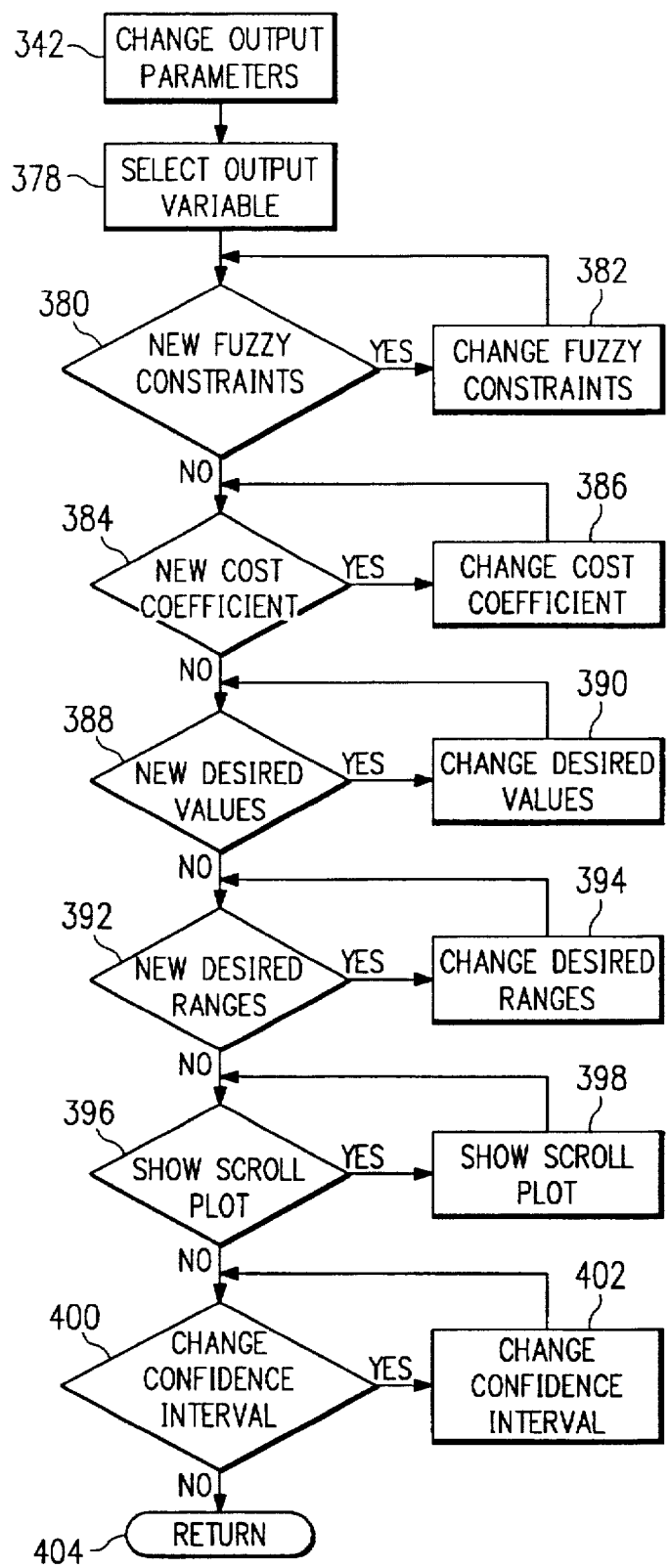
FIG. 14 illustrates a flowchart for changing the output parameters.

Referring now to FIG. 14, there is illustrated a flowchart depicting the operation wherein the output parameters are changed, which is initiated at the block 342 and then flows to a block 378 to select the output variable and then to a decision block 380 to determine whether the fuzzy-constraints are required. If so, the program flows to a function block 382 to change the fuzzy-constraints and then back to the input of decision block 380 until all fuzzy-constraints are changed and then the program flows to a decision block 384, where it is determined whether new cost coefficients are required. If so, the program flows to a function block 386 to change the cost coefficients and then back to the decision block 384 until all cost coefficients have been changed. The program then flows to a decision block 388 to determine if new desired values are required. If so, the program flows to a function block 390 to change the desired values and then back to the input of decision block 388 until all desired values are changed. The program will then flow to a decision block 392 to determine if new desired ranges are required. If so, the program flows to a function block 394 to change the desired ranges and then back to the input of decision block 392 until all desired ranges have been set. The program will then flow through a decision block 396 to determine if the Scroll Plot is to be illustrated. The Scroll Plot is a plot wherein the predicted output is displayed against the actual target value or the predicted values without the constraints on the various output parameters. If so, the program flows to a function block 398 to display the Scroll Plot and then back to the input of decision block 396. After it has been displayed, the program flows to a decision block 400 to determine if the Confidence Interval should be changed. If so, the program flows to a function block 402 to change the Confidence Interval and then back to the decision block 400 until it has been changed, after which the program flows to a return block 404.

Figure 15:
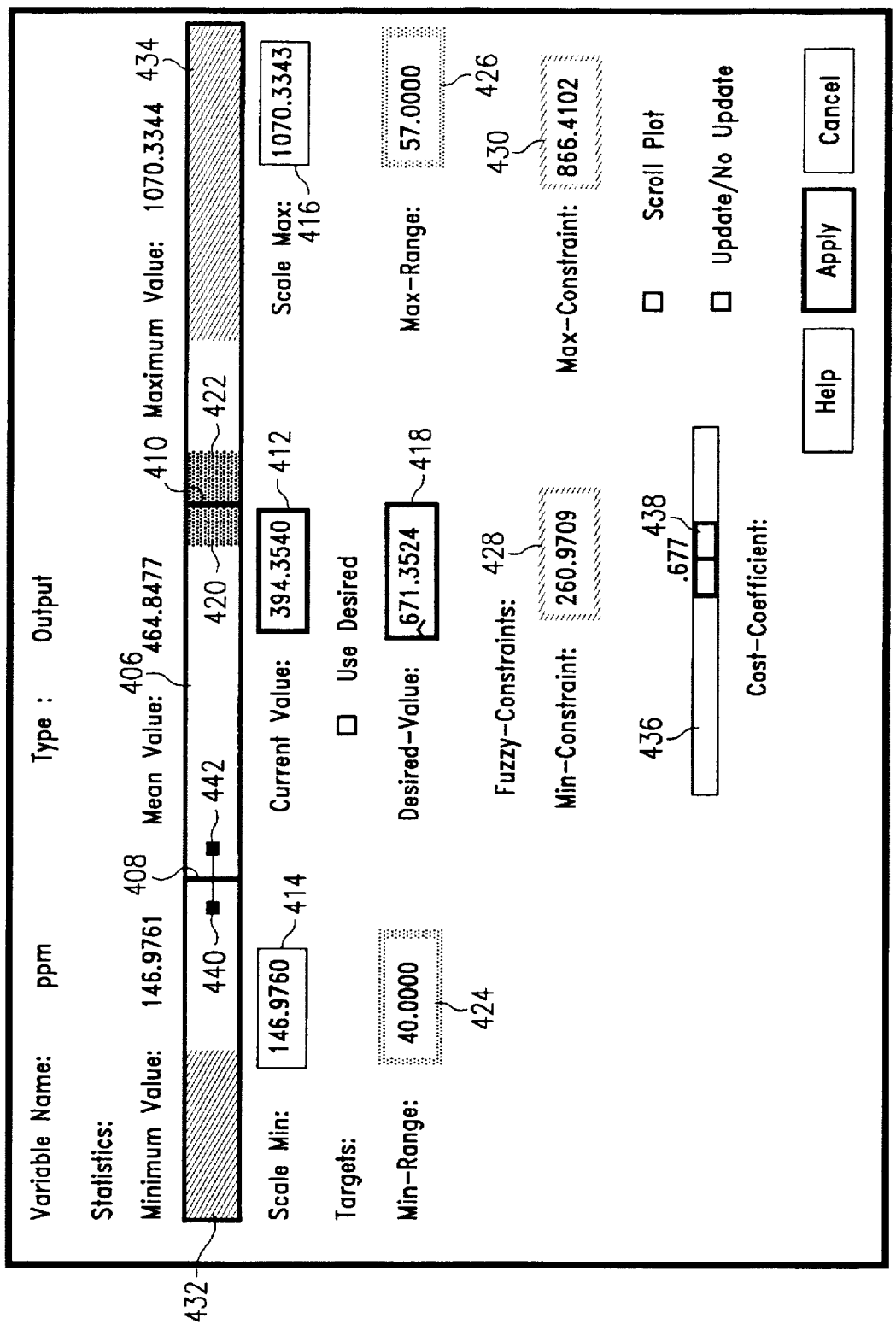
FIG. 15 illustrates a display for changing the output parameter screen.

Referring now to FIG. 15, there is illustrated the display screen for the output wherein the output parameters can be changed. The output, as described above, is labelled PPM, this being one output variable. The display consists of a display bar 406 that has displayed thereon a current value vertical bar 408 and a desired value vertical bar 410. The value of the current value bar 408 is illustrated in a box 412 as being a value of 394.3540. A minimum scale box 414 illustrates the minimum scale value at the far left vertical bar of the display bar 406 as being a value of 146.9762. Similarly, a maximum scale box 416 displays the maximum value of the display bar 406 at the far right vertical bar as being a value of 1070.3344. The desired value associated with the vertical bar 410 is illustrated in a desired value box 418, this value being 671.3524. The desired value associated with the desired value vertical bar 410 has a minimum range and a maximum range illustrated by a left shaded portion 420 and a right shaded portion 422, respectively, associated with vertical bar 410. These are illustrated respectively in a minimum range block 424 and a maximum range block 426. The values illustrated allow the desired value to range from values that are 40.00 below the desired value in box 418 and 57.00 above the value in the desired value box 418.

The fuzzy constraints are defined in a minimum constraint box 428 and a maximum constraint box 430. The value in the minimum constraint box is a value of 260.9709, and is associated with a shaded portion 432 on the left side of the display bar 406. Similarly, the maximum constraint in the box 430 is represented by a shaded portion 434 in the far right side of the display bar 406. As described above, these constraints are set either by entering the value or by using a pointing device and pointing it to the associated vertical bar, either the left vertical bar or the right vertical bar, and pulling it inward to the display bar 406.

A cost coefficient bar 436 is provided that defines the cost coefficient, this coefficient defining the weight given to a particular output value. This will be described in more detail hereinbelow. A sliding indicator 438 is provided within the cost coefficient bar 436 to define the cost coefficient, the value extending from a value of zero at the far left side of the cost coefficient bar 436 and a value of 1.0 at the far right of the cost efficient bar 436, the cost coefficient in FIG. 15 being a value of 0.677.

Figure 16:
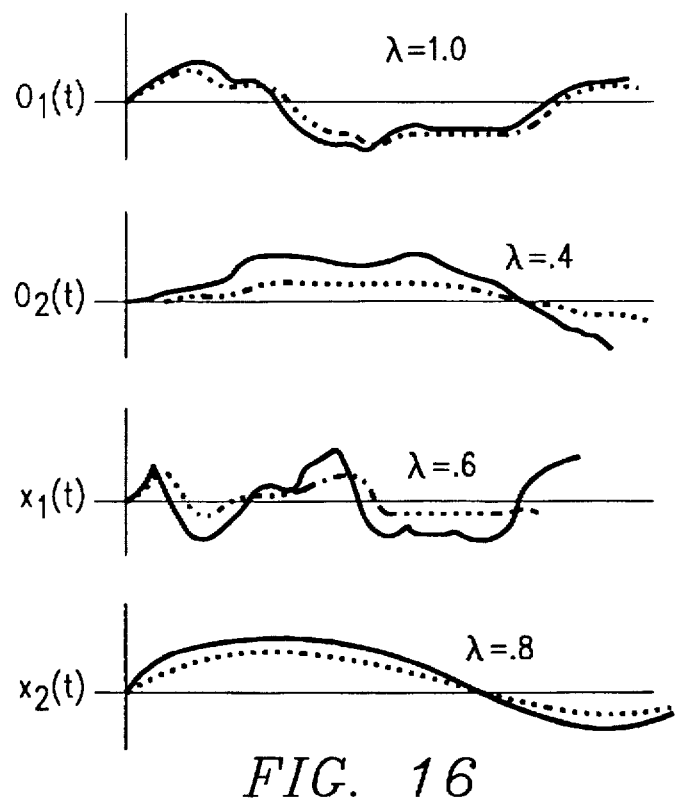
FIG. 16 illustrates plots of input and output variables with different cost-constraints.

When setting the parameters of the output variable, the screen of FIG. 16 is first pulled up which will illustrate the current value of the display bar 408. This current value will have error limits associated therewith, represented by a left error value indicator 440 and a right error indicator 442. The error indicators 440 and 442 represent the confidence in the output; that is, they provide a measure of "goodness" of the output value. If the indicators 440 and 442 are separated by a relatively large amount, this indicates that the error value associated with the current value vertical bar 408 is high; i.e., there is a relatively low confidence in that value. On the other hand, if there is little distance between the two indicators 440 and 442, this indicates a high confidence level in the predicted output. As noted above, the confidence is not the subject of the present application.

The input, as described above, determines how the manufacturing process is to operate. Often, in a manufacturing process, it is useful to determine the appropriate inputs to achieve a desired output criterion. This is to be distinguished from forcing the plant to a desired output. By achieving a desired output criterion, one can determine how the plant operates within these certain criterion. For example, a user may wish to increase the yield of a certain production, decrease the energy consumption, decrease the pollutants or impurities, etc. To achieve these targets, or desired operational properties, the user must provide information as to what the desired behavior of the plant is. The model of the plant is then "inverted" to predict the inputs that would achieve the desired output. In a sense, this provides a determination of the proper "recipe" for the process. For a steady-state solution, this is referred to as process optimization. If this optimality condition is satisfied in an on-line manner, then this determination and implementation is referred to as Process Control.

In general, the desired behavior can be an arbitrarily complicated function of the inputs and outputs. That is, one can write an optimality function or a costfunction that describes the desired behavior of the plant in terms of the actual output of the plant $y_i(t)$, the inputs of the plant $x_j(t)$ and the cost-function parameters $C_k$. This is referred to as a cost function, which can generally be stated as follows:

$$E_{cost} = \sum_{k=1}^{Npats} F(\vec{y}(\vec{x}), \vec{x}, \vec{C}) \tag{17}$$

Where $E_{cost}$ is the total cost, $F()$ is the cost function and $N_{pats}$ is the number of patterns the total cost is evaluated over. Since the actual outputs of the plants are not available during the analysis run, they must be predicted with the model, i.e., it is assumed that the model realized with the neural network is an accurate model, $y(x)=o(x)$. With this predicted output value, the cost function can be written as follows:

$$E_{cost} = \sum_{k=1}^{Npats} F(\vec{o}(\vec{x}), \vec{x}, \vec{C}) \tag{18}$$

In the preferred embodiment, an explicit cost function can be written to satisfy different criterion. However, it should be understood that multiple criteria could be utilized to modify or modulate the process. In the preferred embodiment, the cost function is divided into different pieces for each criteria as follows:

$$E_{cost,k} = E_{1,k} + E_{2,k} + \ldots E_{1,k} \tag{19}$$

where, each of the terms $E_{m,k}$ is the mth error function term for the mth cost criterion associated with the mth property of the plant, for the kth pattern.

Explicitly, to achieve the desired value $d_i$ on an output or predicted state variable $o_i$, the first cost criterion can be written as the following:

$$E_1 = \sum_{i=1}^{Nout} E_{1,i} = \sum_{i=1}^{Nout} \lambda_i f_i(o_i) (o_i(\vec{x}) - d_i)^2 \tag{20}$$

Where the sum is over the number of outputs $N_{out}$. This term has a cost-coefficient $\lambda_i$ so that each output can be weighted differently for different desired properties, and a "fuzzy-cost-coefficient", $f_i(o_i)$, described below, that allows the use of the desired-ranges. This function $E_1$ will be minimum if all of the output variables equal their desired values. Note that additional desired values can be associated with the input variable as well. In this case, another term would exist as follows:

$$E_2 = \sum_{i=1}^{N\text{in}} E_{2,i} = \sum_{i=1}^{N\text{in}} \lambda_i f_i(x_i)(x_i - d_i)^2 \quad (21)$$

where, in this case, the sum is over the input patterns. Again, this cost would be minimized if all the values are equal to the desired values. If this is not possible, as is often the case in real-world situations with conflicting desires, an attempt is made to minimize the cost function such that the total sum-square-error is minimized over all patterns. It is also the case that the user does not have strict, exact values for the desired properties of the process, yet a desired range of values exist. To achieve the behavior in a "fuzzy-range", the fuzzy-cost-coefficient $f_i(z_i)$ can be used. This term functions totally analogously to the overall cost-coefficient $\lambda_i$, but, for the fuzzy coefficient, the cost varies as a function of the output parameter, decreasing to zero at the exact desired value, and increasing to one at the edges of the desired ranges. That is, the fuzzy-cost-coefficient is calculated as function of range as:

$$f_i(z_i) = \begin{cases} 1; & z_i < z_{lower_i} \\ z_i - \dfrac{z_{lower_i}}{d_i - z_{lower_i}}; & (z_{lower_i} < z_i < d_i) \\ z_i - \dfrac{d_i}{z_i - d_i}; & d_i < z_i < z_{upper_i} \\ 1; & z_i > z_{upper_i} \end{cases} \quad (22)$$

This provides a fuzzy-range value with the cost increasing as the value gets further away from the desired-value, where $z_i$ can be any one of the inputs or the outputs, or predicted state variables.

The system can also implement "soft constraints" or "fuzzy-constraints" that allow the user to specify a range of values which he desires the process to avoid. The cost terms of choice for this are as follows:

$$E_3 = \sum_{i=1}^{N\text{out}} E_{3,i} = \sum_{i=1}^{N\text{out}} \alpha_i(z_i(\vec{x}) - c_{upper,i})\theta(z_i(\vec{x}) - c_{upper,i}) \quad (23)$$

Where, $C_{upper,i}$ is the upper fuzzy-constraint limit on the variable, and $\theta(z_i)$ is the Heavyside Step Function, $\theta(z_i)=1$ for $z_i$ non-negative, $\theta(z_i)=0$ otherwise. Similarly, there is fourth term to implement the lower constraints:

$$E_4 = \sum_{i=1}^{N\text{out}} E_{4,i} = \sum_{i=1}^{N\text{out}} \beta_i(C_{lower,i} - z_i(\vec{x}))\theta(C_{lower,i} - z_i(\vec{x})) \quad (24)$$

Where, $C_{lower,i}$ is the lower fuzzy-constraint value and $\beta$ is a cost-coefficient. Thus, the total cost function is written in the present embodiment as:

$$E_{cost} = E_1 + E_2 + E_3 + E_4 \quad (25)$$

This cost function can be minimized via any one of the standard function-minimization techniques such as gradient-descent, simulated annealing, random-search, etc. In the preferred embodiment, the gradient-descent is utilized. In this process, the gradients of this cost function are calculated and the inputs x(i) are changed incrementally so as to minimize the total cost. This set of values will then be the new "recipe" to optimize the plant operation to achieve a desired set of properties.

With further reference to FIG. 3, it can be seen that the hard constraints placed on the input values are associated with the filter 46. The filter 46 allows the user to download parameters that will prevent the input parameters from exceeding certain values, and will also place constraints such as rate of change on the input variables. As described, these are "hard" constraints, which should be differentiated from "soft constraints" or "fuzzy-constraints". The soft constraints are constraints that can be violated, whereas the hard constraints are constraints that cannot be violated. For example, the system should never provide a setpoint with a value that is physically impossible. Therefore, this would be a hard constraint. However, a plant operator may determine that the operation of the valve above or below certain levels is questionable or unreliable and it would therefore be desirable to maintain the valve settings within certain "soft constraints". Additionally, there may be certain constraints that need to be placed on the output of the plant 10. These can be incorporated to the control net operation by placing these constraints onto the predicted output. These soft constraints on the input variables and the predicted output variables are effected by the cost minimization block 42, which performs the various calculations described above. These constraints are determined by the user during the analysis procedure and stored in the storage areas 49, 51 and 53 associated with the cost coefficients, fuzzy constraints and desired values, respectively.

As an example of a situation wherein cost coefficients would be utilized, suppose that the system consisted of a process that operated to output such things as impurity concentrations with input variables such as temperature, flow rates and pump speeds. Additionally, it is known that certain of the input variables, when varied from initial setting, have higher costs associated therewith. For example, it might be known that varying the pump speed would be extremely expensive due to the overall logistics associated therewith, as compared to varying a flow rate. Further, varying a temperature may also be expensive due to the efficiency with which a heater control could deliver a certain amount of heat to the process. As such, these could be identified and various cost coefficients associated therewith. For example, if it were known that varying a flow rate had no bearing on overall costs, then this could have a low high cost coefficient of, for example 0.05. On the other hand, varying the pump speed may be a very cost inefficient operation and this could have a relatively high cost coefficient associated therewith of, for example, 0.95. It may also be known that the flow rate is efficient only within certain regions, and above or below these regions, the expense goes very high. These would be the fuzzy constraints and could be set as such. Although illustrated in the above equations as being step functions, they could be any type of linear or non-linear function.

With respect to the output variables, it might be known that the impurity concentration of a given product, which impurity concentration is the measured value of the product, has a cost factor associated therewith. For a high impurity concentration, the impact of the change may be relatively high, whereas, for a low impurity concentration, the impact may be the opposite. By way of example, in semiconductor processing, it is always, of course, desirable to have a 100% yield. However, this is not practical and a more realistic yield percentage would exist. Since real world constraints require the yield to be above a defined minimum, which is a "break even" yield. Therefore, although it is desirable to have a 100% yield, a yield of 45%, for example, may be acceptable, especially if it relieves some of the constraints on the other processing parameters of process. It would not, for example, be cost efficient to increase the yield from 45% to 75% if this required an increase in the use of an expensive initial processing gas of, for example, Argon. These are relatively expensive gases and it would be desirable to minimize the use of this gas, even though the percent yield would go down, since the overall cost would be improved. Therefore, it can be seen that the desired values of the output and the inputs are not hard constraints.

Referring now to FIG. 16, there is illustrated the plot of two output variables $o_1(t)$ and $o_2(t)$ and a plot of two input variables $x_1(t)$ and $x_2(t)$. The cost coefficient $\lambda_1$ for the first output variable $o_1(t)$ is set equal to 1.0, whereas the cost coefficient $\lambda_2$ for the second output variable is set equal to 0.4. There are two plots, a solid line and a dotted line, the solid line representing the desired output for the plant and the dotted line representing the predicted output with the cost coefficient applied. It can be seen that for the case where $\lambda$ is set equal to 1.0, the predicted output and desired output were essentially the same. However, for the case where $\lambda$ is set equal to 0.4, the predicted output deviates from the desired output or the error therebetween is considerably higher with respect to the output variable $o_1(t)$. This is the same situation with the input variables $x_1(t)$ and $x_2(t)$, where the cost coefficients are set equal to 0.6 and 0.8, respectively. It can therefore be seen that by providing some type of cost constraint on the input variables and the output variable during the prediction operation that predicts the control inputs, the actual predicted control inputs may vary from an actual desired input or output. For example, in a conventional control net, a desired output is input to the net and the input variables forced to values that will result in the predicted output equalling the desired output. However, this may not be the most cost effective way to run the process. Therefore, it can be seen that the control net of the present invention will predict input variables in accordance with user defined criteria that will yield predicted input variables that will operate the plant under this criterion.

Figure 17:
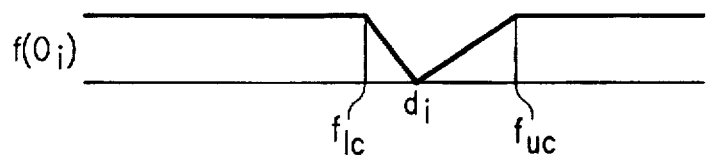
FIG. 17 illustrates a plot of the fuzzy-constraint function.

Referring now to FIG. 17, there is illustrated a plot of the fuzzy constraint function $f(o_i)$ as a function of the value of $o_i$. It can be seen that the value of this function is minimum at the desired value $d_i$ and increases in value as the value of $o_i$ deviates from $d_i$. At the lower constraint, $f_{LC}$, and at the upper constraint $f_{UC}$, the value maintains a constant value.

In summary, there has been provided a control net system for predicting control inputs to a distributed control system that controls a plant. The control net has associated therewith a parallel analysis network that allows the operation of the plant to be analyzed. The parallel analysis network has a representation of the plant provided in the form of a neural network which is operable to receive the control inputs and the state inputs from the plant and generate a predicted output. The predicted output and the control inputs are then processed in accordance with error control equations and predetermined criterion generated by the user to manipulate an inverse model of the network to generate new control variables in accordance with the criterion. These criterion can be varied to determine how the plant will function. These criterion are in the form of hard constraints on the input variables such as the rate of change, upper and lower limits, etc. The operation of the network can then be evaluated in accordance with these criterion to determine the optimum operation of the system. These criterion can then be downloaded to the runtime network for the operation thereof.

What is claimed is:

1. A control system for controlling the operation of a plant, comprising:

a predictive network having an input layer for receiving control inputs for the plant, an output layer for outputting predicted outputs representing a prediction of the output of the plant and a mapping layer for mapping said input layer to said output layer through a stored representation of the plant;

an optimality device for receiving at least two of said predicted outputs or said control inputs as input properties as either the combination of at least one of said predicted outputs and one of said control inputs or the combination of at least two of said predicted outputs and operable to apply an optimality function to each of said input properties, the combination of said optimality functions defining a system optimality value, each of said optimality functions operating such that extremization thereof corresponds to a user-defined desired behavior of said associated input property, said user-defined behavior not the same for each of said optimality functions, said optimality function for each of said input properties having a user-defined behavior that is comprised of an associated weighting factor and a desired value, wherein said weighting factor is applied to a function of the difference between the predicted value of said associated input property and said desired value and said weighting factor is a variable value that is a function of predetermined limits, such that when said actual value of said input property exceeds said limit, the value of said weighting factor changes; and a predictive system for generating updated control inputs that extremize said system optimality value in accordance with said optimality function.

2. The control network of claim 1, wherein said optimality device is operable to receive said predicted outputs as said input properties such that an associated optimality function can be applied to each of the received control inputs and predicted output.

3. The control network of claim 1, wherein said predictive system is an iterative system that is operable to iteratively change said received inputs to said optimality device to provide a new updated value of said control inputs in accordance with a predetermined procedure for extremizing said system optimality value.

4. The control network of claim 1, wherein said predictive system comprises an inverse model of the plant and substantially corresponding to said predictive network, and having:

an input layer;

an output layer;

a plurality of hidden layers for mapping said input layer and said output layer through a stored representation of said plant; and said inverse model operable to operate in an inverse mode to receive on said output layer said system optimality value and back propagate said system optimality value through said plurality of hidden layers to said input layer in accordance with a search technique to generate said updated control inputs.

5. The control network of claim 1, and further comprising a filter device for constraining said control inputs in accordance with user-defined constraints, such that limits are placed on the values that can constitute said control inputs.

6. The control network of claim 5, wherein said user-defined constraints comprise hard limits that limit the value of said updated control inputs from exceeding a predetermined value.

7. The control network of claim 5, wherein said user-defined constraints comprise rate-of-change constraints that define the maximum incremental range that can be applied to the difference between said received inputs and said updated control inputs.

8. The control network of claim 5, wherein said user-defined constraints comprise combinatorial constraints, wherein a predetermined value is defined as the combination of selected ones of said control inputs, such that said selected ones of said control inputs have the values thereof limited so as not to violate said combinatorial constraints.

9. A control system for controlling the operation of a plant that receives control inputs and provides measurements of state variables associated with the operation of the plant and provides an output, comprising:

a distributed control system for distributing generated control inputs to the plant as the received control inputs;

a runtime predictive control system for receiving said generated control inputs and predicting updated control inputs in accordance with a predetermined desired plant behavior; and a filter for placing predetermined constraints on said updated control inputs to provide constrained control inputs, such that limits are placed on the values that can constitute said control inputs, said constrained control inputs provided to said distributed control system for distribution to the plant as said received control inputs and also for distribution of said constrained inputs to said runtime predictive control network, wherein said predetermined constraints comprise combinatorial constraints, wherein a predetermined relationship or range of values is defined as the combination of selected ones of said constrained control inputs, such that said selected ones of said constrained control inputs have the values thereof limited so as not to violate said predetermined relationship.

10. The control system of claim 9, and further comprising an analysis system for determining said desired plant behavior and having:

a simulated predictive control system that is a substantial representation of said runtime predictive control system;

a system for generating analysis control inputs;

a behavior generation device for generating simulated desired plant behavior;

said analysis system for allowing a user to manipulate said simulated desired plant behavior and controlling said system for generating analysis control inputs to generate updated control inputs to cause said simulated predictive control system to operate in accordance with said desired behavior, said analysis system operable to allow the user to observe said desired behavior; and a system for applying said manipulated desired plant behavior after manipulation thereof to said runtime predictive control system as said predetermined desired plant behavior.

11. The control system of claim 10, wherein said analysis system includes a predictive system model having an input layer for receiving said generated control inputs, an output layer for providing a predictive output representing a prediction of the output of the plant and a plurality of mapping layers for mapping said input layer to said output layer through a stored representation of the plant.

12. The control system of claim 9, wherein said runtime predictive control system comprises:

a predictive system model having an input layer for receiving said control inputs that are input to the plant, an output layer for outputting a predicted output representing a prediction of the output of the plant and a plurality of mapping layers for mapping said input layer to said output layer through a stored representation of the plant;

an optimality device for receiving at least two of said predicted outputs or said control inputs as input properties as either the combination of at least one of said predicted outputs and one of said control inputs or the combination of at least two of said predicted outputs and operable to apply an optimality function to each of said input properties, the combination of said optimality functions defining a system optimality value, each of said optimality functions operating such that extremization thereof corresponds to a user-defined desired behavior of said associated input property; and a predictive system for generating updated control inputs that extremize said system optimality value.

13. The control system of claim 12, wherein said predictive system is an iterative system that is operable to iteratively change said received inputs to said optimality device to provide a new updated value of said control inputs in accordance with a predetermined procedure for extremizing said system optimality value.

14. The control system of claim 12, wherein said predictive system model comprises an inverse model of the plant and substantially corresponding to said predictive system model, and having:

an input layer;

an output layer;

a plurality of hidden layers for mapping said input layer and said output layer through a stored representation of said plant; and said inverse model operable to operate in an inverse mode to receive on said output layer said system optimality value and back propagate said system optimality value through said hidden layer to said input layer in accordance with a search technique to generate said updated inputs.

15. The control system of claim 9, wherein said runtime predictive neural network is operable to receive as inputs the measured state variables of the plant in addition to said control inputs.

16. The control system of claim 15, wherein said runtime predictive control system comprises:

a predictive system model having an input layer for receiving said control inputs that are input to the plant and said measured state variables, an output layer for outputting a predicted output representing a prediction of the output of the plant and a plurality of mapping layers for mapping said input layer to said output layer through a stored representation of the plant;

an optimality device for receiving at least two of said predicted outputs as input properties and operable to apply an optimality function to each of said input properties, the combination of said optimality functions defining a system optimality value, each of said optimality functions operating such that the extremum thereof corresponds to a user-defined desired behavior of said associated input property; and a predictive system for generating updated control inputs that extremize said system optimality value.

17. The control system of claim 9, wherein said predetermined constraints are hard constraints such that said constrained inputs have values that are limited relative to the value of said updated control inputs, said constrained inputs prevented from exceeding a predetermined value.

18. The control system of claim 9, wherein said predetermined constraints comprise rate-of-change constraints that define the maximum incremental change that can be applied to the difference between said constrained input and said received inputs received by said runtime predictive control network.

19. A control system for controlling the operation of a plant that receives control inputs and provides measurements of state variables associated with the operation of the plant and provides an output, comprising:
- a distributed control system for distributing generated control inputs to the plant as the received control inputs;
- a storage device for storing control system operating parameters;
- a runtime predictive control system for receiving said control inputs and predicting updated control inputs for distribution by said distributed control system to the plant in accordance with said stored control system operating parameters to achieve a predetermined desired plant behavior;
- an analysis system having a stored representation of said predictive control system and operable to simulate the operation of said runtime predictive control system with said stored representation thereof with internally generated simulated control inputs to determine a desired set of control system operating parameters; and
- said analysis system having an output device for downloading said determined desired set of control system operating parameters to said storage device for storage as said stored control system operating parameters.

20. The control system of claim 19, wherein said analysis system comprises:
- a simulated predictive control system that is a substantial representation of said runtime predictive control system;
- a system for generating analysis control inputs;
- a control system operating parameter generation device for generating simulated control system operating parameters; and
- a manipulation device for allowing a user to manipulate said simulated predictive control network and said system for generating analysis control inputs to generate updated control inputs to cause said simulated predictive control system to operate in accordance with said simulated control system operating parameters, said manipulation device operable to allow the user to observe the desired plant behavior.

21. The control system of claim 20, wherein said manipulation device includes a predictive system model having an input layer for receiving said generated control inputs, an output layer for providing a predictive output representing a prediction of the output of the plant and a mapping layer for mapping said input layer to said output layer through a stored representation of the plant.

22. The control system of claim 19, wherein said runtime predictive control system comprises:
- a predictive system model having an input layer for receiving said control inputs that are input to the plant, an output layer for outputting a predicted output representing a prediction of the output of the plant and a plurality of mapping layers for mapping said input layer to said output layer through a stored representation of the plant;
- an optimality device for receiving at least two of said predicted outputs or said control inputs as input properties as either the combination of at least one of said predicted outputs and one of said control inputs or the combination of at least two of said predicted outputs and operable to apply an optimality function to each of said input properties, the combination of said optimality functions defining a system optimality value, each of said optimality functions operating such that the extremum thereof corresponds to a user-defined desired behavior of said associated input property; and
- a predictive system for generating updated control inputs that extremize said system optimality value.

23. The control system of claim 19, wherein said predictive system model is an iterative system that is operable to iteratively change said received inputs to said optimality device to provide a new updated value of said control inputs in accordance with a predetermined procedure for extremizing said system optimality value.

24. The control system of claim 23, wherein said predictive system comprises an inverse model of the plant and substantially corresponding to said predictive network, and having:
- an input layer;
- an output layer;
- a plurality of hidden layers for mapping said input layer and said output layer through a stored representation of said plant; and
- said inverse model operable to operate in an inverse mode to receive on said output layer said system optimality value and back propagate said system optimality value through said hidden layers to said input layer in accordance with a search technique to generate said updated control inputs.

25. The control network of claim 19, and further comprising a filter device for constraining said control inputs in accordance with user-defined constraints, such that limits are placed on the values that can constitute said control inputs.

26. The control network of claim 25, wherein said user-defined constraints comprise hard limits that limit the value of said updated control inputs from exceeding a predetermined value.

27. The control system of claim 25, wherein said user-defined constraints comprise rate-of-change constraints that define the maximum incremental range that can be applied to the difference between said received inputs and said updated control inputs.

28. The control system of claim 25, wherein said user-defined constraints comprise combinatorial constraints, wherein a predetermined value is defined as the combination of selected ones of said control inputs, such that said selected ones of said control inputs have the values thereof limited so as not to violate said combinatorial constraints.

29. A method for generating updated control inputs for controlling the operation of a plant, comprising the steps of:
- receiving control inputs for the plant, which control inputs are operable to control the plant;
- processing the received control inputs through a predictive system model having a stored representation of the plant and providing predicted outputs;
- receiving at least two of the predicted outputs or the control inputs as input properties as either the combination of at least one of the predicted outputs and one of the control inputs or the combination of at least two of the predicted outputs;
- applying a separate optimality function to each of the input properties, the combination of the optimality functions defining a system optimality value, each of the optimality functions operating such that extremization thereof corresponds to a user-defined desired behavior of the associated input property, the user-defined behavior not the same for each of the optimality functions, which user-defined behavior is comprised of an associated weighting factor and a desired value, wherein the weighting factor is applied to a function of the difference between the predicted value of the associated input property and desired value; and predicting the updated control inputs that extremize the system optimality value.

30. The method of claim 29, wherein the step of predicting the updated control inputs comprises iteratively changing the received control inputs to which the optimality function is applied to provide a new updated value of the control inputs in accordance with a predetermined procedure for extremizing the system optimality value.

31. The method of claim 29, wherein the step of predicting the updated control inputs comprises:

providing a predictive model having an input layer, an output layer and a plurality of hidden layers for mapping the input layer to the output layer through a stored representation of the plant;

operating the predictive model in an inverse mode;

receiving on the output layer the system optimality value when the system model is in the inverse mode; and backpropagating the system optimality value through the hidden layer to the input layer in accordance with a search technique to generate the updated control inputs.

32. The method of claim 29, and further comprising constraining the control inputs in accordance with user-defined constraints.

33. The method of claim 32, wherein the step of constraining the control inputs comprises hard-limiting the control inputs to a predetermined value such that the updated control inputs do not exceed the predetermined value.

34. The method of claim 32, wherein the step of constraining the control inputs comprises limiting the rate of change of the updated control inputs to define the maximum incremental change that can be applied to the difference between the received inputs that are received by the plant and the updated control inputs.

35. The method of claim 32, wherein the step of constraining the control inputs comprises applying combinatorial constraints to the updated control inputs, wherein a predetermined value is defined as the combination of selected ones of the updated control inputs, such that selected ones of the updated control inputs have the value thereof limited so as not to violate the combinatorial constraints.

36. A method for generating updated control inputs for controlling the operation of a plant that receives control inputs and provides measurements of state variables associated with the operation of the plant and provides an output, comprising the steps of:

providing a distributed control system that is operable to distribute generated control inputs to the plant as the received control inputs;

processing the generated control inputs through a runtime predictive control system to predict updated control inputs in accordance with a predetermined desired plant behavior; and placing predetermined constraints on the updated control inputs to provide constrained control inputs, such that limits are placed on the values that can constitute the control inputs, the constrained control inputs provided to the distributed control system for distribution to the plant as the received control inputs and also for distribution of the constrained inputs to the runtime predictive control network, wherein the predetermined constraints comprise combinatorial constraints, wherein a predetermined relationship or range of values is defined as the combination of selected ones of the constrained control inputs, such that the selected ones of the constrained control inputs have the values thereof limited so as not to violate the predetermined relationship.

37. The method of claim 36, and further comprising the step of determining the desired plant behavior by the steps of:

providing a simulated predictive control system that is a substantial representation of the runtime predictive control system;

generating analysis control inputs;

processing the analysis control inputs through the simulated predictive control system;

generating simulated desired behavior;

manipulating the simulated desired behavior and controlling the step of generating analysis control inputs to generate updated control inputs to cause the simulated predictive control system to operate in accordance with the simulated desired behavior, the step of manipulating allowing a user to observe the simulated desired behavior; and applying a manipulated desired behavior after manipulation to the runtime predictive control system as the predetermined desired plant behavior.

* * * * *